United States Patent
Cheng et al.

(10) Patent No.: US 11,199,453 B2
(45) Date of Patent: Dec. 14, 2021

(54) SYSTEMS AND METHODS FOR BOND-SELECTIVE TRANSIENT PHASE IMAGING

(71) Applicants: Trustees of Boston University, Boston, MA (US); Purdue Research Foundation, West Lafayette, IN (US)

(72) Inventors: Ji-Xin Cheng, Newton, MA (US); Delong Zhang, Brownsburg, IN (US); Lu Lan, West Lafayette, IN (US)

(73) Assignees: TRUSTEES OF BOSTON UNIVERSITY, Boston, MA (US); PURDUE RESEARCH FOUNDATION, West Lafayette, IN (US)

( * ) Notice: Subject to any disclaimer, the term of this patent is extended or adjusted under 35 U.S.C. 154(b) by 0 days.

(21) Appl. No.: 17/067,345

(22) Filed: Oct. 9, 2020

(65) Prior Publication Data

US 2021/0108968 A1     Apr. 15, 2021

Related U.S. Application Data

(63) Continuation of application No. 16/865,082, filed on May 1, 2020, now Pat. No. 10,845,248.
(Continued)

(51) Int. Cl.
*G01J 5/08* (2006.01)
*G02F 1/125* (2006.01)
(Continued)

(52) U.S. Cl.
CPC ............ *G01J 5/0821* (2013.01); *G02F 1/125* (2013.01); *H01S 3/094076* (2013.01); *G01J 2005/0077* (2013.01)

(58) Field of Classification Search
CPC . G01J 5/0821; G01J 2005/0077; G02F 1/125; H01S 3/094076
See application file for complete search history.

(56) References Cited

U.S. PATENT DOCUMENTS 5,586,824 A   12/1996  Barkyoumb
5,684,592 A   11/1997  Mitchell
(Continued)

OTHER PUBLICATIONS

Zernike, F.; "Phase contrast, a new method for the microscopic observation of transparent objects"; *Physica* 9, No. 10, pp. 974-980; Dec. 1942 (15 pages).
(Continued)

*Primary Examiner* — Blake C Riddick
(74) *Attorney, Agent, or Firm* — Nixon Peabody LLP

(57) ABSTRACT

A method includes directing a first plurality of probe laser pulses through a sample, dividing each of the first plurality of probe laser pulses to generate a first interferogram, and generating first image data reproducible as a first phase image of the sample. A plurality of pump laser bursts are directed onto the sample to heat the sample. A second plurality of probe laser pulses are directed through the sample at a predetermined time delay. Each of the second plurality of probe laser pulses are divided to generate a second interferogram. Second image data is generated that is reproducible as a second phase image of the sample. A transient phase shift is determined in the second phase image relative to the first phase image. A vibrational spectroscopy property is determined of the sample based on the transient phase shift, thereby allowing an identification of chemical bond information of within the sample.

21 Claims, 16 Drawing Sheets
(7 of 16 Drawing Sheet(s) Filed in Color)

Related U.S. Application Data

(60) Provisional application No. 62/841,513, filed on May 1, 2019.

(51) Int. Cl.
*H01S 3/094* (2006.01)
*G01J 5/00* (2006.01)

(56) References Cited

U.S. PATENT DOCUMENTS

| | | |
|---|---|---|
| 5,959,735 A | 9/1999 | Maris |
| 6,108,087 A | 8/2000 | Nikoonahad |
| 9,046,492 B1 | 6/2015 | Prater |
| 9,250,061 B2 | 2/2016 | Lorbeer |
| 2002/0189945 A1 | 12/2002 | Ruggiero |
| 2005/0249248 A1 | 11/2005 | He |
| 2006/0132795 A1 | 6/2006 | Millerd |
| 2007/0027689 A1 | 2/2007 | Ozcan |
| 2008/0304046 A1 | 12/2008 | Lee |
| 2009/0212769 A1 | 8/2009 | Stoica |
| 2010/0110426 A1 | 5/2010 | Cicerone |
| 2011/0069309 A1 | 3/2011 | Newbury |
| 2011/0178379 A1 | 7/2011 | Dudhia |
| 2012/0122084 A1 | 5/2012 | Wagner |
| 2013/0134310 A1 | 5/2013 | Furstenberg |
| 2013/0296694 A1 | 11/2013 | Ehlers |
| 2014/0240710 A1 | 8/2014 | Shigekawa |
| 2015/0085098 A1 | 3/2015 | Dowaki |
| 2015/0129766 A1 | 5/2015 | Gbauidi |
| 2015/0253248 A1 | 9/2015 | Wickramasinghe |
| 2017/0102532 A1 | 4/2017 | Frankel |
| 2017/0127983 A1 | 5/2017 | Spegazzini |
| 2018/0128759 A1 | 5/2018 | Hurley |
| 2018/0180642 A1 | 6/2018 | Shetty |
| 2019/0056313 A1 | 2/2019 | Miller |
| 2019/0120753 A1 | 4/2019 | Prater |
| 2019/0204230 A1 | 7/2019 | Ota |
| 2020/0025677 A1 | 1/2020 | Prater |
| 2020/0113439 A1 | 4/2020 | Mohseni |

OTHER PUBLICATIONS

Gabor, D.; "A new microscopic principle"; *Nature* 161, 777-778; 1948 (2 pages).
Leith, E. N. et al.; "Reconstructed wavefronts and communication theory"; *J. Opti. Soc. Am.* vol. 52, No. 10, pp. 1123-1130; 1962 (8 pages).
Schnars, U. et al.; "Direct recording of holograms by a CCD target and numerical reconstruction"; *Appl. Opt.* vol. 33, No. 2, pp. 179-181; Jan. 10, 1994 (3 pages).
Yamaguchi, I. et al.; "Phase-shifting digital holography", *Opt. Lett.* vol. 22, No. 16, pp. 1268-1270; Aug. 15, 1997 (3 pages).
Xu; W. B. et al.; "Digital in-line holography for biological application"; *Proc. Natl Acad. Sci. USA* vol. 98, No. 20, pp. 11301-11305; Sep. 25, 2011 (5 pages).
Iwai, H. et al.; "Quantitative phase imaging using actively stabilized phase-shifting low-coherence interferometry"; *Opt. Lett.* vol. 29, No. 20, pp. 2399-2401; Oct. 15, 2004 (3 pages).
Marquet, P. et al.; "Digital holographic microscopy: a noninvasive contrast imaging technique allowing quatitative visualization of living cells with subwavelength axial accuracy"; *Opt. Lett.* vol. 30, No. 5, pp. 468-470; Mar. 1, 2005 (3 pages).
Popescu, G. et al.; "Diffraction phase microscopy for quantifying cell structure and dynamics"; *Opt. Lett.* vol. 31, No. 6, pp. 775-776; Mar. 15, 2009 (3 pages).
Shaked, N. T. et al.; "Dual-interference-channel quantitative-phase microscopy of live cell dynamics"; *Opt. Lett.* vol. 34, No. 6, pp. 767-769; Mar. 15, 2009 (3 pages).
Greenbaum, A. et al.; "Imaging without lenses: achievements and remaining challenges of wide-field on-chip microscopy"; *Nat. Methods* 9(9), pp. 889-895, Sep. 2012 (14 pages).

Park, Y. et al.; "Quantitative phase imaging in bio-medicine"; *Nat. Photonics* vol. 12, pp. 578-589; Oct. 2018 (12 pages).
Waller, L. et al. "Tansport of intensity phase-amplitude imaging with higher order intensity derivatives"; *Opt. Express* vol. 18, No. 12, pp. 12552-12561; Jun. 7, 2010 (10 pages).
Ford, T. N. et al.; Phase-gradient microscopy in thick tissue with oblique back-illumination; *Nat. Methoda* vol. 9, No. 12, pp. 1195-1197; Dec. 2012 (5 pages).
Zheng, G. A. et al.; "Wide-field, high-resolution Fourier ptychographic microscopy"; *Nat. Photonics* 7 99), pp. 739-745; Sep. 1, 2013 (16 pages).
Tian, L. et al.; "Multiplexed coded illumination for Fourier Ptychography with an LED array microscope"; *Biomed. Opt. Express* 5, 5376-2389; 2014 (14 pages).
Dunn, G. A. et L.; "Dynamics of fibroblast spreading"; *J. Cell Sci.* 108, pp. 1239-1249; 1995 (11 pages).
Charrière, F. et al.; "Living specimen tomography by digital holographic microscopy; morphometry of testate amoeba"; *Opt. Express* vol. 14, No. 16, pp. 7005-7013; Aug. 7, 2006 (9 pages).
Park, Y. K. et al.; "Refractive index maps and membrane dynamics of human red blood cell parasitized by Plasmodium falciparm"; *Proc. Natl Acad. Sci. USA* vol. 105, No. 37, pp. 13730-13735; Sep. 16, 2008 (6 pages).
Mir, M. et al.; "Optical measurement of cycle-dependent cell growth"; Proc. *Natl Acad. Sci. USA* vol. 108, No. 32.
Sridharan, S. et al.; "Prediction of prostate cancer recurrence using quantitative phase imaging"; *Sci. Rep.* 5, 9976; DOI: 10.1038/srepogg9976; May 15, 2015 (10 pages).
Hosseini, P. et al.; "Pushing phase and amplitude sensitivity limits in interferometric microscopy"; *Opt. Lett.* vol. 41, No. 7, pp. 1656-1659; Apr. 1, 2016 (4 pages).
Park, Y. K. et al.; "Diffraction phase and amplitude sensitivity limits in interferometric microscopy"; *Opt. Express* vol. 14, No. 18, pp. 8263-8268; May 31, 2016 (6 pages).
Dardikman, G. et al.; "Integral refractive index imaging of flowing cell nuclei using quantitative phase microscopy combined with fluorescence microscopy"; *Biomed. Opt. Express* vol. 9, No. 3, pp. 1177-1189; Mar. 1, 2018 (13 pages).
Goetz, G. et al.; "Interferometric mapping of material properties using thermal perturbation"; *Proc. Natl Acad. Sci. USA* vol. 115, No. 11, pp. E2499-E2508; Jan. 2018 (10 pages).
Bhaduii, B. et al.; "Diffraction phase microscopy: principles and applications in mateiials and life sciences"; *Adv. Opt. Photonics* 6, pp. 57-119; Mar. 26, 2014 (63 pages).
Toda, K. et al.; "Molecular contrast on phase-contrast microscope"; Sci. Rep. 9, 9957; Jul. 18, 2019 (7 pages).
Tamamitsu, M. et al., "Quantitative phase imaging with molecular vibrational sensitivity"; *Opt. Lett.* vol. 44, No. 15, pp. 3729-3732, Aug. 1, 2019 (4 pages).
Cariou, J. M. et al., "Refractive-index variations with temperature of PMMA and polycarbonate", *Appl. Opt.* vol. 25, No. 3, pp. 334-336, Feb. 1, 1986 (3 pages).
Choi, W. et al.; "Tomographic phase microscopy"; *Nat. Methods* vol. 4, No. 9, pp. 717-719; Sep. 2007 (3 pages).
Kim, T. et al.; "White-light diffraction tomography of unlabelled live cells"; *Nat. Photonics* vol. 8, pp. 256-263; Mar. 2014 (8 pages).
Tian; L. et al.; "3D intensity and phase imaging from light field mea-surements in an LED array microscope"; *Optica* vol. 2; No. 2; pp. 104-111; Feb. 2015 (8 pages).
Zhang, D. L. et al.; "Depth-resolved mid-infrared photothermal imaging of living cells and organisms with submicrometer spatial resolution"; *Sci. Adv.* 2, e1600521; Sep. 28, 2016 (7 pages).
Mértiri, A. et al.; "Mid-infrared photothermal heterodyne spectroscopy in a liquid crystal using a quantum cascade laser"; *Appl. Phys. Lett.* 101, 044101; 2012 (4 pages).
Mertiri, A. et al.; "Nonlinear midinfrared photothermal spectroscopy using Zharov splitting and quantum cascade lasers"; *ACS Photonics* vol. 1, pp. 696-702; Jul. 18, 2014 (7 pages).
Totachawattana, A. et al., "Vibrational mid-infrared photorerrnal spectroscopy using a fiber laser probe: asymptotic limit in signal-to-baseline contrast"; *Opt. Lett.* vol. 41, No. 1, pp. 179-182, Jan. 1, 2016 (4 pages).

(56) References Cited

OTHER PUBLICATIONS

Li, Z. M. et al.; "Super-resolution far-field infrared imaging by photothermal heterodyne imaging"; *J. Phys. Chem. B* 121, 8838-8846; 2017 (9 pages).

Bai, Y. R. et al.; "Bond-selective imaging of cells by mid-infrared photothermal microscopy in high wavenumber region". *J. Phys. Chem. B* 121, 10249-10255; Nov. 9, 2017 (16 pages).

Chatterjee, R. et al.; "Subdiffraction infrared imaging of mixed cation perovskites: probing local cation heterogeneities"; *ACS Energy Lett.* 3, 469-475; Jan. 25, 2018 (7 pages).

Wieliczka, D. M. et al.; "Wedge shaped cell for highly absorbent liquids: infrared optical constants of water"; *Appl. Opt.* vol. 28, No. 9, pp. 1714-1719; May 1, 1989 (6 pages).

Chowdhury, S. et al.; "Structured illumination quantitative phase microscopy for enhanced resolution amplitude and phase imaging"; *Biomed. Opt. Express* vol. 4, No. 10, pp. 1795-1805; Oct. 1, 2013 (11 pages).

Hanninen, A. M. et al.; "High-resolution infrared imaging of biological samples with third-order sum-frequency generation microscopy"; *Biomed. Opt. Express* vol. 9, No. 10, pp. 4807-4817; Oct. 1, 2018 (11 pages).

F. Zernike; "How I Discovered Phase Contrast"; Science vol. 121, pp. 345-349; Mar. 11, 1955 (5 pages).

W. E. Kock; "Nobel Prize for Physics: Gabor and Hagography"; Science vol. 174, pp. 674-675; 1971 (2 pages).

Zhang, D. et al.; "Bond-selective transient phase imaging via sensing of the infrared photothermal effect"; Light: Science and Applications; Dec. 11, 2019; retrieved from https://www.nature.com/articles/s41377-019-0224-0 (13 pages).

International Search Report and Written Opinion of International Searching Authority for Application No. PCT/US2020/030909, dated Aug. 6, 2020 (14 pages).

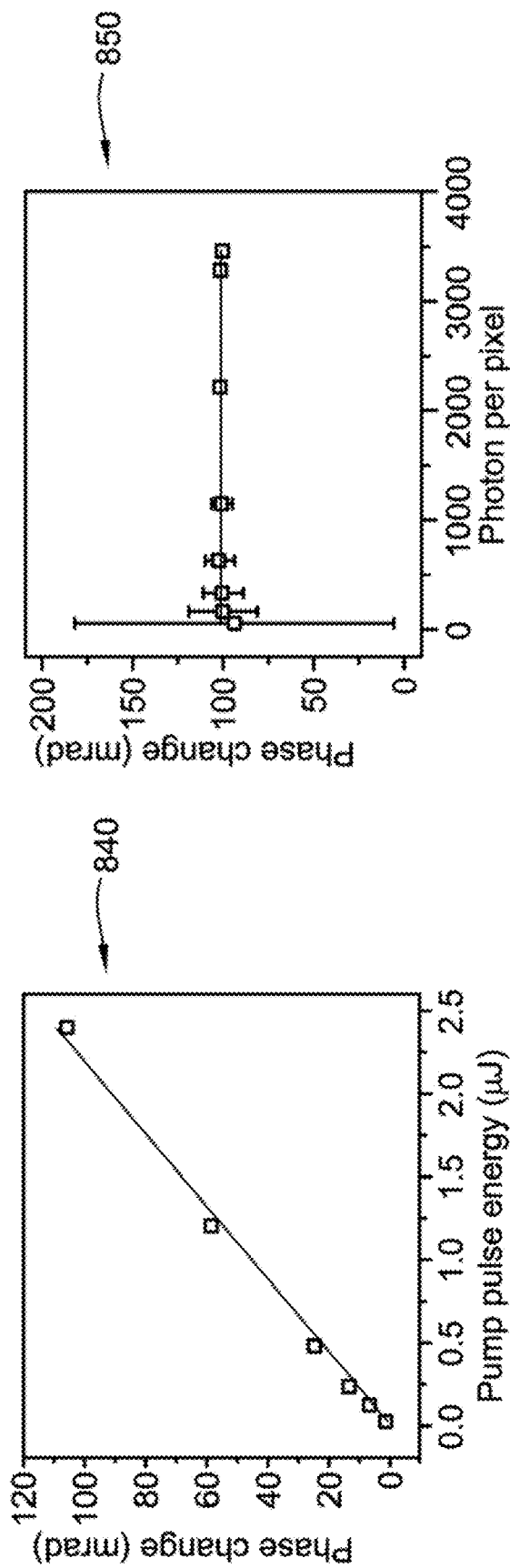
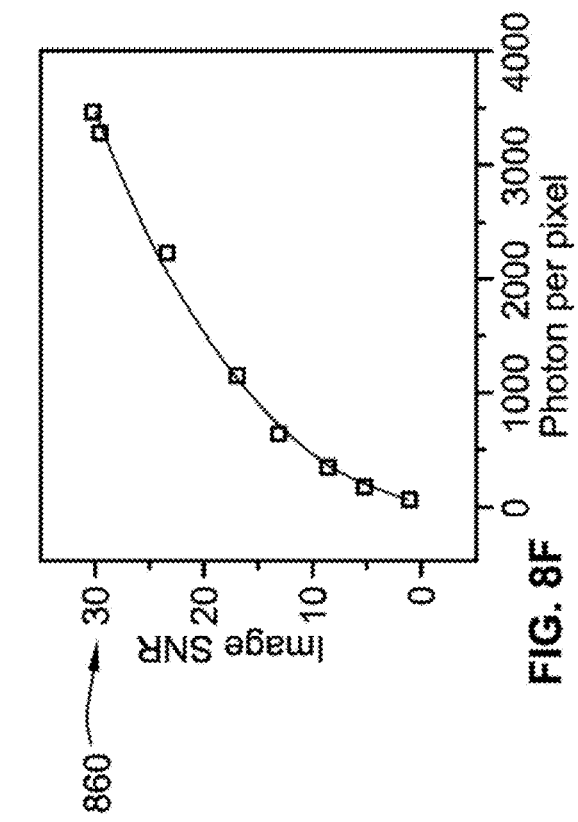
FIG. 8D
FIG. 8E
FIG. 8F

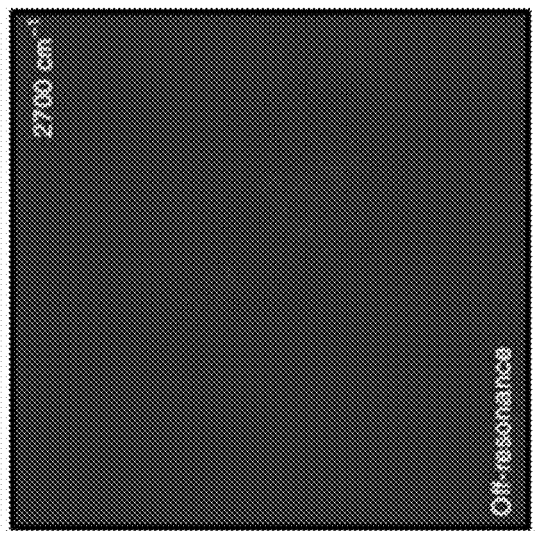
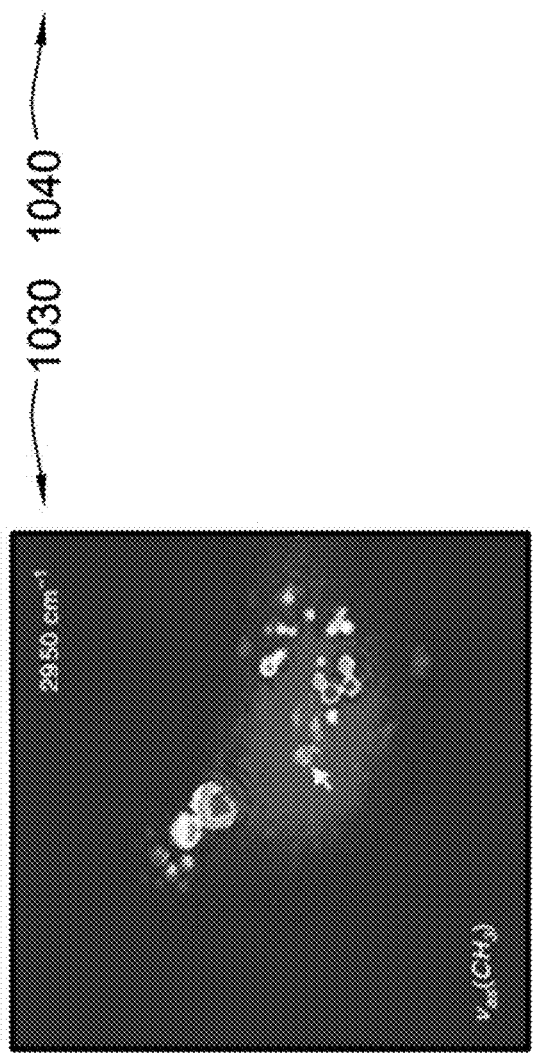
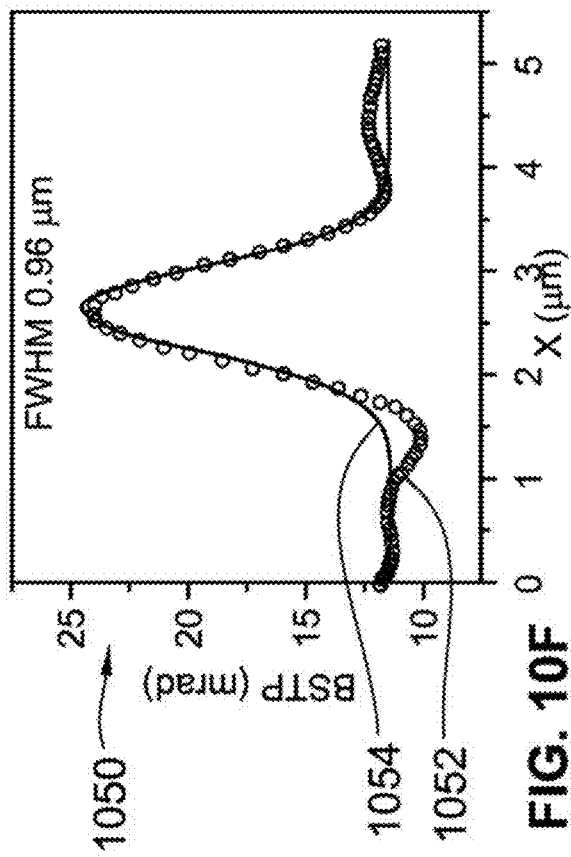
FIG. 10E
FIG. 10D
FIG. 10F

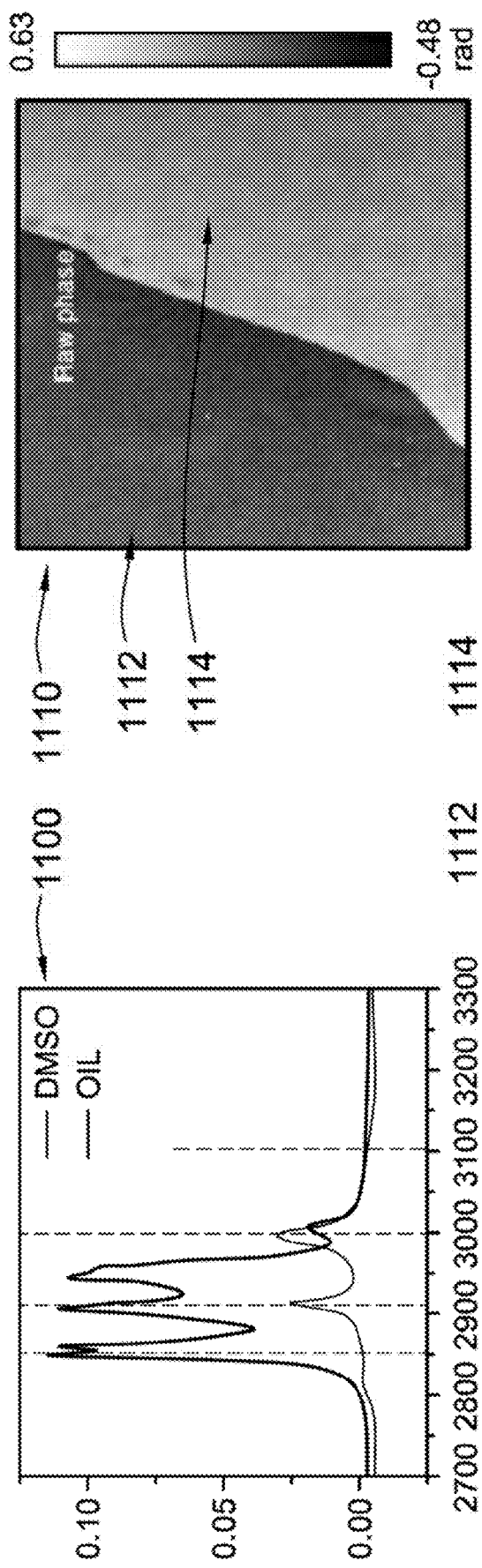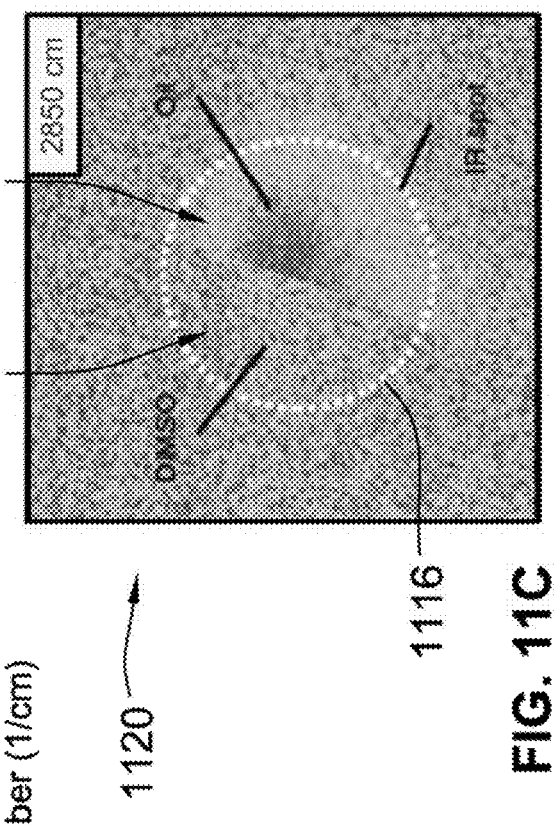
FIG. 11A
FIG. 11B
FIG. 11C

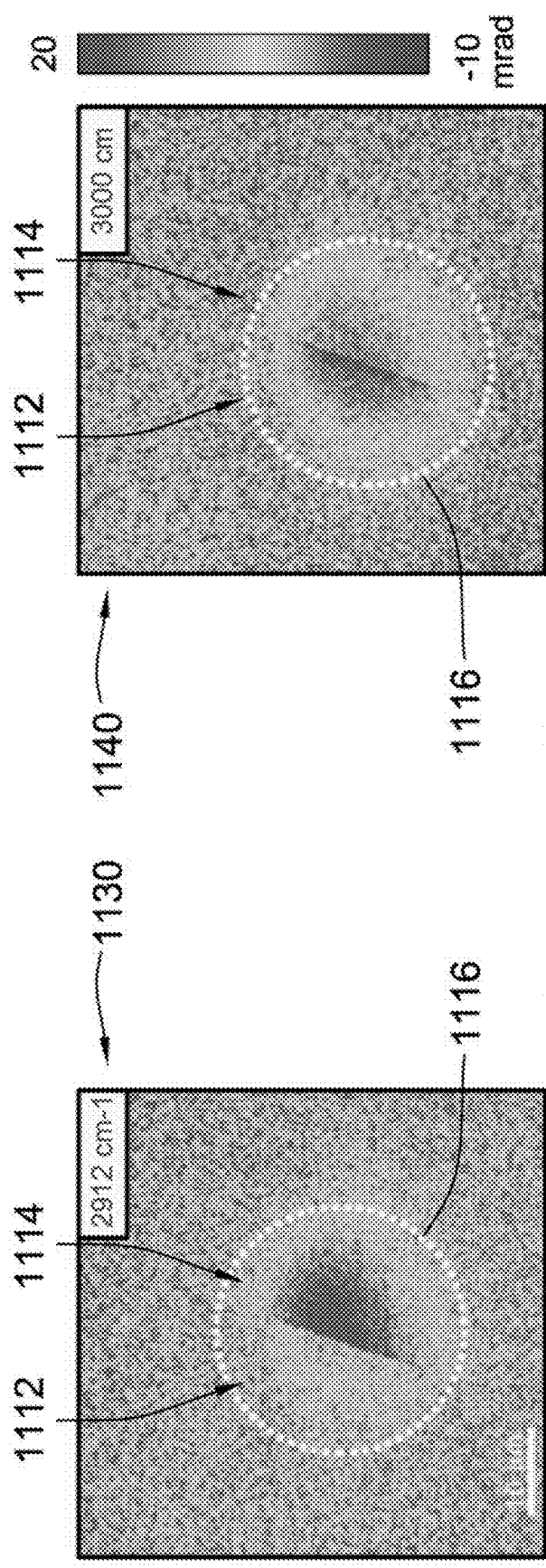
FIG. 11D
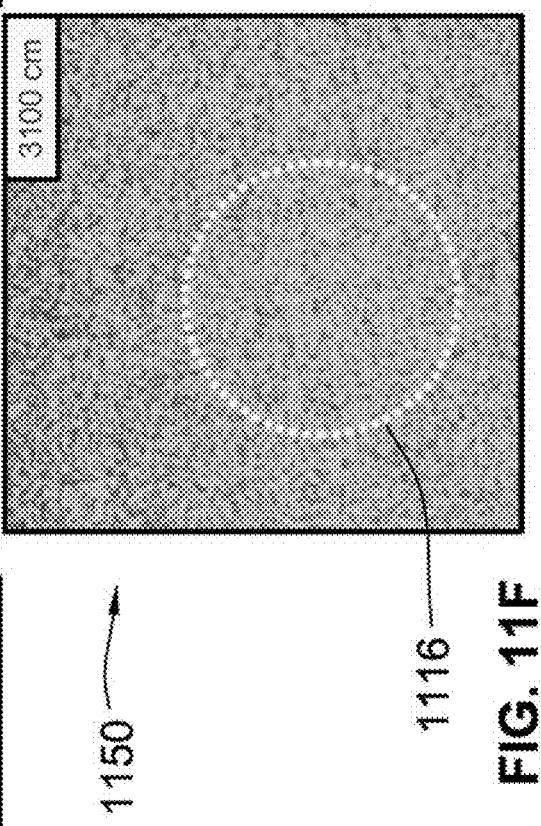
FIG. 11F
FIG. 11E

SYSTEMS AND METHODS FOR BOND-SELECTIVE TRANSIENT PHASE IMAGING

CROSS-REFERENCE TO RELATED APPLICATIONS

This application is a continuation of U.S. Non-Provisional application Ser. No. 16/865,082, filed May 1, 2020, now allowed, which claims the benefit of and priority to U.S. Provisional Application No. 62/841,513, filed on May 1, 2019, each of which are hereby incorporated by reference herein in their entireties.

TECHNICAL FIELD

The present disclosure relates generally to imaging systems and methods, and more particularly, to systems and methods for generating bond-selective transient phase (BSTP) images of a sample.

BACKGROUND

In infrared (IR) imaging, the energy from IR absorption causes a temperature increase in the sample, which changes refractive index and thus optical path length via the thermo-optic effect. Measuring this temperature change using phase imaging could provide the intrinsic molecular spectroscopy of the sample. However, the temperature increase caused by IR absorption is transient (e.g., dissipating within a few microseconds to hundreds of microseconds). Current cameras are limited by an imaging speed up to a few thousand frames per second and therefore cannot record the transient changes in phase shift due to the temperature increase. The present disclosure is directed to addressing these and other problems.

SUMMARY

According to some implementations of the present disclosure, a method includes directing a first plurality of probe laser pulses through the sample, dividing each of the first plurality of probe laser pulses into a plurality of waves to generate a first interferogram, and generating first image data reproducible as a first phase image of the sample based at least in part on the first interferogram. The method also includes directing a plurality of laser bursts onto the sample to heat at least a portion of the sample, each of the plurality of pump laser bursts having a first wavelength. The method further includes directing a second plurality of probe laser pulses through the sample, each of the second plurality of probe laser pulses passing through the sample at a predetermined time delay subsequent to a corresponding one of the plurality of pump laser bursts, dividing, the each of the second plurality of probe laser pulses into a plurality of waves to generate a second interferogram, generating second image data reproducible as a second phase image of the sample based at least in part on the second interferogram. The method includes determining a first transient phase shift at a location in the second phase image relative to a corresponding location in the first phase image and determining a vibrational spectroscopy property of the sample based at least in part on the determined first transient phase shift, thereby allowing an identification of chemical bond information of within the sample.

According to some implementations of the present disclosure, a method includes directing, using a probe laser source, a first plurality of probe laser pulses through the sample and an objective lens, dividing, using a transmission grate and one or more lenses, each of the first plurality of probe laser pulses into a plurality of waves to generate a first interferogram at an image plane of a camera, and generating, using the camera, first image data reproducible as a first phase image of the sample based at least in part on the first interferogram. The method also includes directing, using (i) a pump laser, (ii) a chopper, (iii) a shutter, and (iv) a plurality of mirrors, a plurality of pump laser bursts onto the sample to heat at least a portion of the sample, each of the plurality of pump laser bursts having a first wavelength and including at least one pump laser pulse. The method further includes directing, using the probe laser source, a second plurality of probe laser pulses through the sample and the objective lens, each of the second plurality of probe laser pulses passing through the sample at a predetermined time delay subsequent to a corresponding one of the plurality of pump laser bursts, dividing the each of the second plurality of probe laser pulses into a plurality of waves to generate a second interferogram at the image plane of the camera, generating, using the camera, second image data reproducible as a second phase image of the sample based at least in part on the second interferogram, and generating a bond-selective transient phase (BTS) image of the sample based at least in part on the first phase image and the second phase image.

According to some implementations of the present disclosure, a system includes a probe laser configured to emit a probe laser beam, a pump laser configured to emit a pump laser beam, a chopper positioned between the pump laser and the sample, a shutter positioned between the chopper and the sample, the shutter including an aperture, a camera, an objective lens positioned between the sample and the camera, and a memory storing machine-readable instructions. The system also includes a control system including one or more processors, the control system configured to execute the machine-readable instructions to: cause the probe laser to generate a first plurality of probe laser pulses such that the first plurality of probe laser pulses are directed through the sample and the objective lens to form a first interferogram at an image plane of the camera, cause the camera to generate first image data reproducible as a first phase image of the sample based at least in part on the first interferogram, cause the chopper to modulate the pump laser beam to generate a plurality of pump laser bursts, each of first plurality of pump laser bursts (i) having a first wavelength and (ii) including at least one pump laser pulse; cause the shutter to move from a first position to a second position to permit the first plurality of pump laser bursts to pass through the aperture for a predetermined duration such that the first plurality of pump laser bursts heat at least a portion of the sample, cause the probe laser to generate a second plurality of probe laser pulses such that (i) each of the second plurality of probe laser pulses are directed through the sample at a predetermined time delay subsequent to a corresponding one of the plurality of pump laser bursts and (ii) the second plurality of probe laser pulses form a second interferogram at the image plane of the camera, cause the camera to generate second image data reproducible as a second phase image of the sample based at least in part on the second interferogram, and generate a bond-selective transient phase (BSTP) image of the sample based at least in part on the first phase image and the second phase image.

The above summary is not intended to represent each embodiment or every aspect of the present invention. Additional features and benefits of the present invention are apparent from the detailed description and figures set forth below.

BRIEF DESCRIPTION OF THE DRAWINGS

This application file contains at least one drawing executed in color. Copies of this patent application publication with color drawings will be provided by the Office upon request and payment of the necessary fee.

FIG. 8D illustrates a plot indicative of pump power dependence, according to some implementations of the present disclosure;

FIG. 8E illustrates a plot indicative of probe power dependence, according to some implementations of the present disclosure;

FIG. 8F illustrates a plot indicative of a signal-to-noise ratio of the BSTP signal (FIG. 8B), according to some implementations of the present disclosure;

FIG. 10D illustrates a third exemplary BSTP image of the 3T3 cells at a third wavelength, according to some implementations of the present disclosure;

FIG. 10E illustrates a fourth exemplary BSTP image of the 3T3 cells at a fourth wavelength, according to some implementations of the present disclosure;

FIG. 10F illustrates a plot including a BSTP intensity profile and a Gaussian fitting result, according to some implementations of the present disclosure;

FIG. 11A illustrates a plot indicative of a measured FTIR spectra of a dimethyl sulfoxide (DMSO) and oil sample, according to some implementations of the present disclosure;

FIG. 11B illustrates an exemplary raw phase image of the DMSO and oil sample, according to some implementations of the present disclosure;

FIG. 11C illustrates a first exemplary BSTP image of the DMSO and oil sample at a first wavelength, according to some implementations of the present disclosure;

FIG. 11D illustrates a second exemplary BSTP image of the DMSO and oil sample at a second wavelength, according to some implementations of the present disclosure;

FIG. 11E illustrates a third exemplary BSTP image of the DMSO and oil sample at a third wavelength, according to some implementations of the present disclosure;

FIG. 11F illustrates a fourth exemplary BSTP image of the DMSO and oil sample at a fourth wavelength, according to some implementations of the present disclosure;

Figure 1:
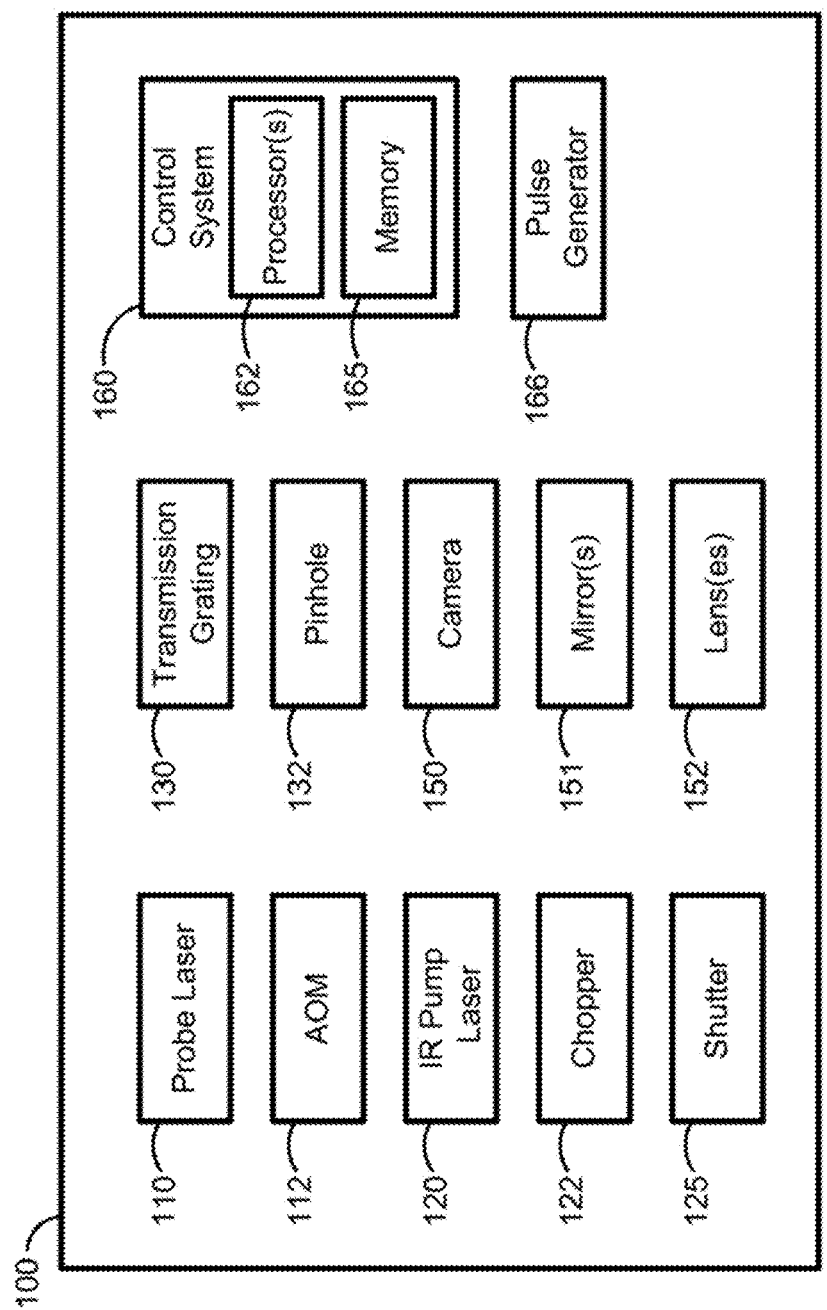
FIG. 1 is a schematic illustration of a first system for generating a bond-selective transient phase image of a sample, according to some implementations of the present disclosure.

While the disclosure is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Phase-contrast microscopy or phase imaging is generally used to generate images of a sample by converting the phase shift of light passing through the sample (e.g., a biological cell) into brightness variations in an image. Phase imaging has broad applications in cellular dynamics and disease diagnosis. However, the phase of photons passing through the sample is generally insensitive to the chemical composition of the sample, making it difficult to use phase imaging to understand molecular interactions in a complex system. While fluorescent labeling has been used in combination with phase imaging to measure the chemical composition, fluorescent labeling also has several drawbacks and limitations such as, for example, photo-bleaching, perturbation of biological structure, and the inability to label small molecules.

Intrinsic molecular bond vibrations can be used as a label-free contrast for chemical imaging via either infrared (IR) absorption or Raman scattering spectroscopy. IR absorption has a stronger effect (e.g., attenuation of the light by the sample) than Raman scattering, and the IR spectroscopy for common chemicals is well-known. However, direct IR imaging has lower spatial resolution that visible imaging techniques like the phase imaging techniques described above. Further, it is difficult to extract the intrinsic absorption property of the sample from other attenuation effects, such as scattering and/or reflection.

The energy from IR absorption causes a temperature increase in the sample, which changes the refractive index of the sample and the optical path length via the thereto-optic effect. Measuring this temperature change using phase imaging can reveal the intrinsic molecular spectroscopy of the sample. This temperature increase caused by IR absorption is transient (e.g., dissipating within a few microseconds to hundreds of microseconds). It would be desirable to record these transient changes in phase shift using a microscopy system so as to reveal chemical information associated with the sample (e.g., chemical bond information). However, current cameras are limited by an imaging speed up to a few thousand frames per second and therefore cannot record the transient changes in phase shift due to the temperature increase. The systems and methods described herein address these and other problems.

Referring to FIG. 1, a system 100 for generating bond-selective transient phase (BTSP) images of a sample (e.g., including living cells) is illustrated. The system 100 includes a probe laser 110, an acousto-optical modulator (AOM) 112, a pump laser 120, a chopper 122, a shutter 124, a transmission grating 130, a pinhole 132, a camera 140, one or more mirrors 150, one or more lens(es) 152, a control system 160, a memory 164, and a pulse generator 166.

The probe laser 110 emits probe laser pulses that can pass through the sample and be detected by the camera 140. In some implementations, the probe laser 110 is a femtosecond laser that emits light having a wavelength between about 500 nm and about 1100 nm. That is, the wavelength of the probe laser 110 is adjustable or tunable within a predetermined range. The probe laser 110 also has a low relative intensity noise (e.g., about −140 dBc(Hz)-1) and a low coherence length (e.g., about 30 μm) to aid in reducing speckle noise in the interferogram images described herein.

For example, the probe laser 110 can emit a femtosecond pulse train having a wavelength between about 520 nm and a repetition rate of about 80 Hz, which can be obtained by frequency doubling a 1040 nm wavelength light.

In some implementations, the probe laser 110 is a Ti-sapphire laser. In one non-limiting example, the probe laser 110 is a Ti-sapphire laser that can generate a 1040 nm, 80-MHz, 100-fennosecond pulsed laser. In another non-limiting example, the probe laser 110 is a Chameleon Ti-sapphire femtosecond laser manufactured by Coherent of Santa Clara, Calif. (USA).

The AOM 112 modulates the probe laser pulses emitted by the probe laser 110. In other words, the AOM 112 selectively permits the probe laser pulses from the probe laser 110 to reach the sample. In some implementations, the AOM 112 can have a wavelength between about 400 nm and about 850 nm, a rise/fall time between about 13 ns and about 160 ns, an active aperture diameter of between about 0.32 nm and about 2 mm, an operating frequency between about 80 MHz and about 200 MHz, a crystalline quartz or tellurium dioxide optical material, or any combination thereof. In some implementations, the system 100 includes a linear polarized light with a pockel generator that can be used to generate probe laser pulses instead of the AOM 112.

The pump laser 120 emits a laser beam. The laser beam can generally have any wavelength, such as, for example, within the IR spectrum (e.g., between about 0.7 μm and about 1000 μm) or the near-infrared spectrum and/or visible spectrum (e.g., between about 400 μm and about 2,000 nm). Preferably, the laser beam emitted from the pump laser 120 has a wavelength within the mid-IR spectrum (e.g., between about 4000 $cm^{-1}$ and about 400 $cm^{-1}$, between about 2700 $cm^{-1}$ and about 3300 $cm^{-1}$, between about 800 $cm^{-1}$ and about 1800 $cm^{-1}$, etc.). The pump laser 120 can have a pulse width of less than about 10 ns and a repetition rate of about 150 kHz. In some implementations, the pump laser is a Firefly-HW manufactured by M-Squared Lasers of Glasnow (UK).

The chopper 122 modulates the laser beam emitted by the pump laser 120 to generate a plurality of IR laser bursts. Each of the laser bursts includes at least one laser pulse (e.g., 1 laser pulse, 2 laser pulses, 3 laser pulses, 6 laser pulses, etc.). The tuning of the chopper 122 can be controlled by, for example, a triggering signal from the pulse generator 166. In some implementations, the chopper 122 is a MC1F10A mechanical chopper manufactured by Thorlabs Inc. of Newton, N.J. (USA).

The shutter 124 includes and aperture that can be selectively moved between a first position (e.g., an open position) and a second position (e.g., a closed position) to selectively permit the IR laser bursts from passing through the shutter (e.g., an onto the sample). The timing of the shutter 124 can be controlled by, for example, a triggering signal from the pulse generator 166. In some implementations, the shutter 124 is a LS6 shutter manufactured by Vincent Associates of Rochester, N.Y. (USA).

The transmission grating 130 is generally positioned between the sample and the camera 140 and divides the probe laser pulses from the probe laser 110 and AOM 112 into a plurality of waves alter the probe laser pulses pass through the sample. More specifically, the transmission grating 130 can be positioned at the conjugate plane of the sample. The plurality of waves include a first-order wave and a second-order wave, which are then directed towards the camera 140. Any others of the plurality of waves are blocked and do not reach the camera 140. As described in further detail herein, interference between the first-order wave and the second-order wave created an interferogram from which a phase image of the sample can be generated. In some implementations, the transmission grating 130 is a transmission grating having 110 grooves/mm manufactured by Edmund Optics, of Barrington, N.J. (USA).

The pinhole 134 filters the first-order wave created by the transmission grating 130. The pinhole 134 can have a predetermined diameter that is between about 1 μm and about 20 μm. In some implementations, the pinhole 134 is a 15 μm P15H pinhole manufactured by Thorlabs (USA).

The camera 140 generates image data reproducible as one or more images of the sample (e.g., one or more phase images of the sample) based on light received from the probe laser pulses that pass through the sample. The camera 140 can be, for example, a complementary metal-oxide-semiconductor (CMOS) camera. The well depth of the camera 140 can be, for example, between about 30,000 photoelectrons and about 2,000,000 photoelectrons. The frame rate of the camera 140 can be, for example, between about 50 frames per second and about 300 frames per second, about 100 frames per second, etc.

The one or more mirrors 150 are generally used to aid in directing laser pulses and/or bursts from the probe laser 110 and/or the pump laser 120 to the sample and/or the camera 140. The one or more mirrors can be positioned between one or more of the elements of the system 110, as described in further detail herein, and can include, for example, one or more gold parabolic mirrors, one or more edge mirrors, one or more angled mirrors, or any combination thereof. The one or more mirrors 150 can generally include any suitable number of mirrors (e.g., 1 mirror, 3 mirrors, 6 mirrors, 10 mirrors, etc.).

The one or more lenses 152 are generally used to focus the laser pulses and/or laser bursts generated by the probe laser 110 and/or the pump laser 120. The one or more lenses 152 can include, for example, an optical lens, a microscope objective lens, or both.

The control system 160 includes one or more processor(s) 162 (hereinafter, "processor 162"). The processor 162 can be a general or special purpose processor or microprocessor, and the control system 160 can include any suitable number of processors (e.g., one processor, a plurality of processors, etc.). The control system 160 can be communicatively coupled (e.g., using a wired or wireless connection) to the probe laser 110, the AOM 112, the pump laser 120, the chopper 122, the shutter 124, the camera 140, the pulse generator 166, or any combination thereof. The control system 160 can be centralized (within one housing) or decentralized (within two or more of housings, which are physically distinct). In implementations including two or more housings containing the control system 160, housings can be located proximately and/or remotely from each other.

The memory device 164 stores machine-readable instructions that are executable by the processor 162 of the control system 160. The memory device 164 can be any suitable computer readable storage device or media, such as, for example, a random or serial access memory device, a hard drive, a solid state drive, a flash memory device, etc. While one memory device 164 is shown in FIG. 1, the system 100 can include any suitable number of memory devices 164 (e.g., one memory device, two memory devices, live memory devices, ten memory devices, etc.). Like the control system 160, the memory device 164 can be centralized (within one housing) or decentralized (within two or more of housings, which are physically distinct).

In some implementations, the control system 160 is a data acquisition (DAQ) card. In such implementations, the DAQ can be for example, a PCIe-6363 DAQ manufactured by National Instrument of Austin, Tex. (USA).

The pulse generator 166 generates one or more triggering signals for actuating one or more components of the system 100 in sequence. For example, as described in further detail herein, using the 150 kHz repetition rate of the pump laser 120 as a master clock, the pulse generator 166 can generate (i) a 1 kHz triggering signal for the chopper 122, the control system 160, the AOM 114, or any combination thereof; (ii) a 50 Hz triggering signal for the shutter 124, (iii) a 100 Hz trigger signal for the camera 140, or (iv) any combination thereof. In some implementations, the pulse generator 166 is a 9200 pulse generator manufactured by Quantum Composers Inc., of Bozeman, Mont. (USA).

While system 100 is shown as including all of the components described above, more or fewer components can be included in a system for generating one or more BSTP images of a sample according to implementations of the present disclosure. For example, a first alternative system includes the probe laser 110, the pump laser 120, and the camera 140. Thus, various systems can be formed using any portion or portions of the components shown and described herein and/or in combination with one or more other components.

Figure 2:
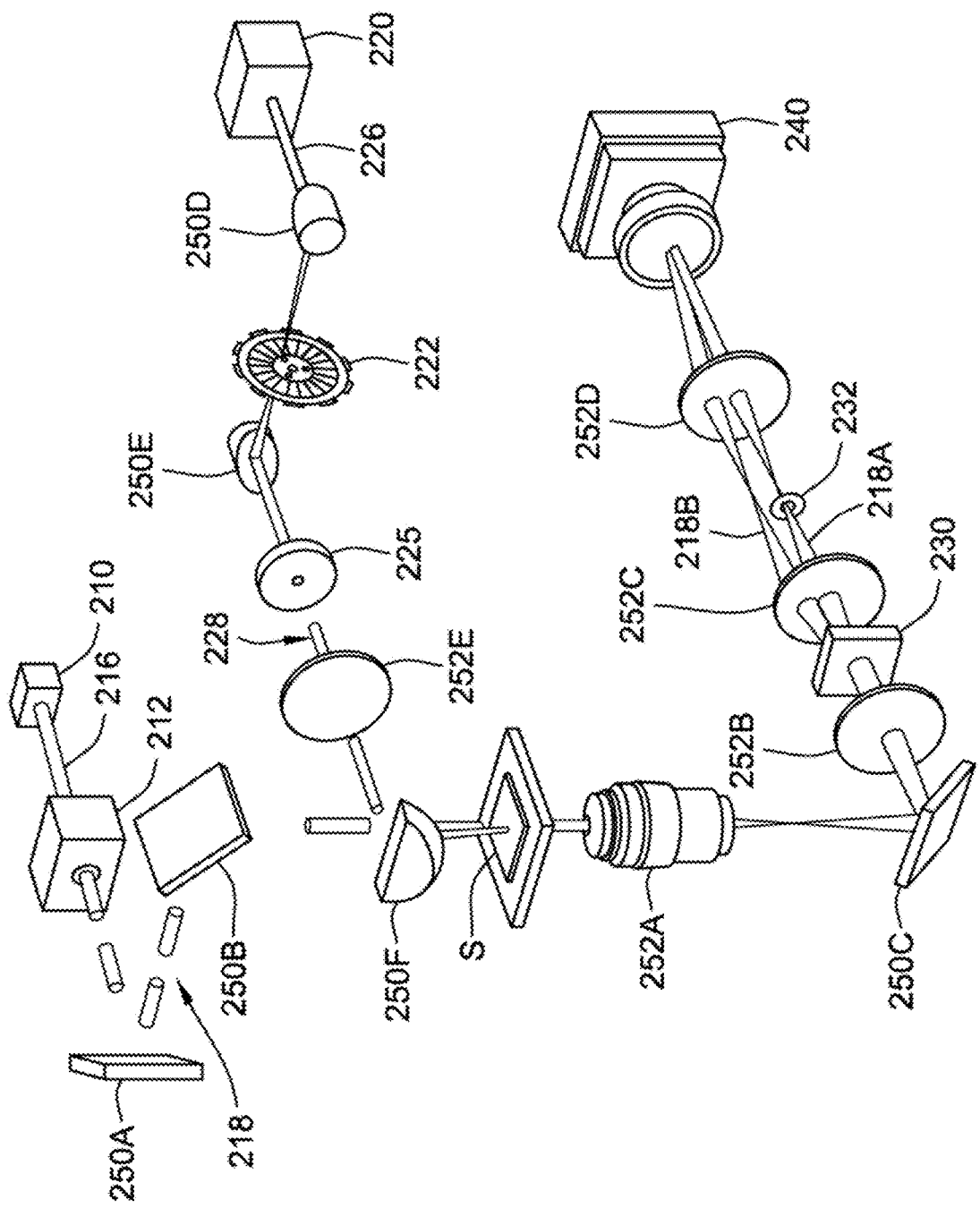
FIG. 2 is a schematic illustration of a second system for generating a bond-selective transient phase image of a sample, according to some implementations of the present disclosure.

Referring to FIG. 2, a system 200 that is the same as, or similar to, the system 100 (FIG. 1) is illustrated. The system 200 includes a probe laser 210, an AOM 212, an IR pump laser 220, a chopper 222, a shutter 224, a transmission grating 232, a pinhole 232, a camera 240, a plurality of mirrors 250A-250F, and a plurality of lenses 252A-252E.

The probe laser 210 and the AOM 212 are the same as, or similar to, the probe laser 110 and the AOM 112 of the system 100 (FIG. 1) described herein. As shown, the probe laser 210 generates a probe laser beam 216, and the AOM 212 modulates or divides the probe laser beam 216 into a plurality of probe laser pulses 218. A first mirror 250A and a second mirror 250B are positioned between the AOM 212 and the sample S and direct the plurality of probe laser pulses 218 towards the sample S such that each of the probe laser pulses 218 is directed onto the sample S at an orthogonal angle (e.g., about 90 degrees) relative to an upper surface of the sample S.

The probe laser pulses 218 pass through the sample S towards the objective lens 252A. The objective lens 252A can have a magnification of about ×20 and a numerical aperture of about 0.35, for example. The probe laser pulses 218 pass through the objective lens 252A and are directed by a third mirror 250C towards a second lens 252B. The probe laser pulses 218 pass through the second lens 252B and reaches the transmission grating 230.

The transmission grating 230 is the same as, or similar to, the transmission grating 130 of the system 100 (FIG. 1) described herein and splits each of the probe laser pulses 218A into a plurality of waves, including a first-order wave 218A and a second-order wave 218B. The first-order wave 218A is filtered by the pinhole 232, which is the same as, or similar to, the pinhole 132 of the system 100 (FIG. 1) described herein. The pinhole 232 is generally positioned between the third lens 252C and the fourth lens 252D, and more specifically positioned at the Fourier plane of the third lens 252C. In some implementations, the system 200 includes a short single mode fiber or a spatial light modulator (SLM) to filter the first-order wave 218A instead of the pinhole 232.

The filtered first-order wave 218A then passes through a third lens 252D and reaches the camera 240, which the same as, or similar to, the camera 140 of the system 100 (FIG. 1)

described herein. By contrast, the second-order wave 218B is not filtered and passes through the third lens 252D to the camera 240. As described in further detail herein, interference between the first-order wave 218A and the second-order wave 218B generates an interferogram at an image plane of the camera 240.

In some implementations, the third lens 252C has a focal length of about 60 mm and the fourth lens 252D has a focal length of about 150 mm. In such implementations, the third lens 252C can be an EF-S Macro 60 mm F/2.8 lens manufactured by Canon (USA), and the fourth lens 252D can be an LA1433-A lens manufactured by Thorlabs (USA).

The IR pump laser 220 is the same as, or similar to, the IR pump laser 120 of the system 100 (FIG. 1) described herein and generates an IR laser beam 226. The IR laser beam 226 is directed towards the chopper 222 by a fourth mirror 250D. The fourth mirror 250D differs from the first mirror 250A, the second mirror 250B, and the third mirror 250C in that the fourth mirror 250D is a gold parabolic mirror. In some implementations, the fourth mirror 250D is a MDP149-M01 gold parabolic mirror manufactured by Thorlabs (USA).

The chopper 222 is the same as, or similar to, the chopper 122 of the system 100 (FIG. 1) described herein. The chopper 222 modules or divides the IR laser beam 226 includes a plurality of IR laser bursts 228. Each of the IR laser bursts 228 includes at least one IR laser pulse (e.g., 1 IR laser pulse, 2 IR laser pulses, 6 IR laser pulses, etc.). The IR laser bursts 228 from the chopper 222 are then directed by a fifth mirror 250E towards the shutter 224. The fifth mirror 250E is the same as, or similar to, the fourth mirror 250D.

The shutter 224 is the same as, or similar to, the shutter 124 of the system 100 (FIG. 1) and can be selectively opened and closed to permit the IR laser bursts 228 to pass through continue towards the sample (e.g., in response to a triggering signal). After passing through the shutter, the IR laser bursts 228 pass through a fifth lens 252E and are directed towards a sixth mirror 250F. The fifth lens 252E focuses the IR laser bursts 228 onto the sample S. In some implementations, the fifth lens 252E is a calcium fluoride lens with a focal length of between about 50 mm and 200 mm (e.g., about 100 mm). The sixth mirror 250F differs from the mirrors 250A-250E in that the sixth mirror 250F is an edge mirror that directs the IR laser bursts 218 onto the sample S at an oblique angle (e.g., less than 45 degrees, less than 20 degrees, less than 10 degrees, less than 5 degrees, etc.) relative to the probe laser pulses 218. In some implementations, the sixth mirror 250F is a PRF10-03-M01 edge mirror manufactured by Thorlabs (USA).

In some implementations, one or more of the components of the system 200 can be mounted on an inverted microscope frame (e.g., an Olympus IX51 microscope frame manufactured by Olympus (USA)).

Figure 3:
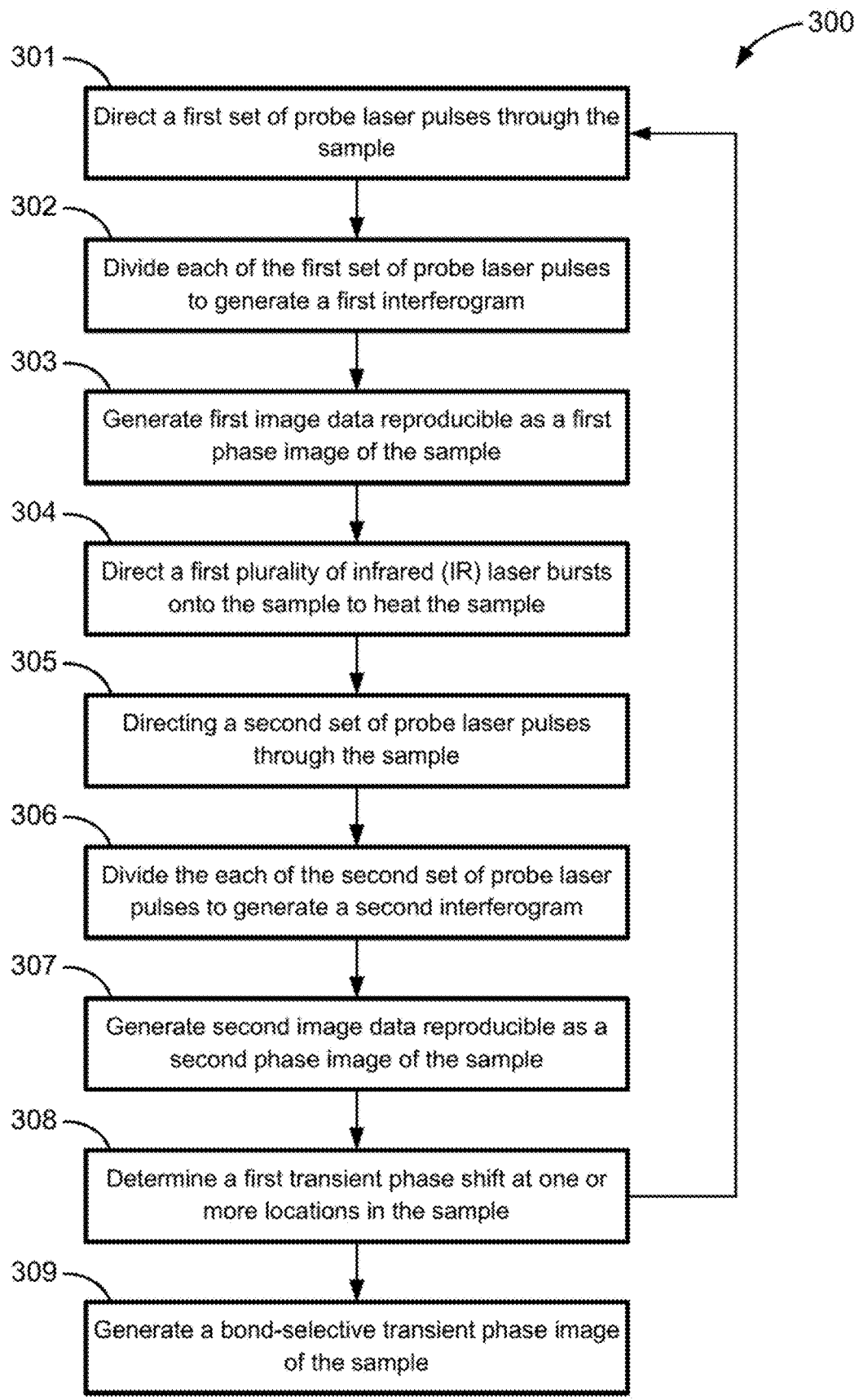
FIG. 3 is a process flow diagram illustrating a method for generating a bond-selective transient phase image of a sample, according to some implementations of the present disclosure.

Referring to FIG. 3, a method 300 for generating a bond-selective transient phase image of a sample is illustrated. The method 200 can be implemented using the system 100, the system 200, or any of the alternative systems described herein. The sample can include, for example, living biological cells.

Step 301 of the method 300 includes directing a first set of probe laser pulses through the sample. For example, referring to FIG. 2, the probe laser 210, the AOM 212, the first mirror 250A, and the second mirror 250B cooperate to cause laser probes 218 to be directed towards and through the sample S (e.g., via the mirrors 250A and 250B in FIG. 2). The first set of probe laser pulses can include any suitable number of probe laser pulses (e.g., 1 probe laser pulse, 3 probe laser pulses, 10 probe laser pulses, 20 probe laser pulses, etc.).

Step 302 of the method 300 includes dividing the first plurality of probe laser pulses into a plurality of waves after passing through the sample, where the plurality of waves includes a first-order wave and a second order-wave. For example, referring to FIG. 2, the transmission grating 230 divides the probe laser pulses into the first-order wave 218A and the second order wave 218B after the probe laser pulses pass through the sample S. The first-order wave and the second order-wave are directed (e.g., through lens 252D in FIG. 2) towards the camera (e.g, camera 240 in FIG. 2) and interfere with one another at the image plane of the camera to create a first interferogram. For example, referring to FIG. 4A, an exemplary first interferogram 410 created by interference between the first-order wave and the second order-wave of the probe laser pulse(s) is illustrated.

Step 302 can also include filtering the first-order wave before the first-order wave reaches the camera. For example, referring to FIG. 2, the pinhole 232 can be used to filter the first-order wave 218A prior to reaching the camera 240.

Figure 4B:
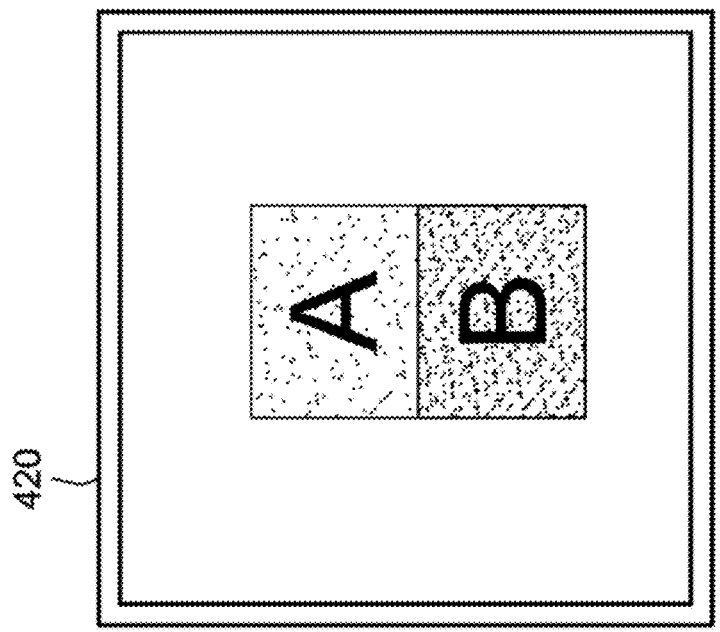
FIG. 4B illustrates a first phase image of the sample, according to some implementations of the present disclosure.
Figure 4A:
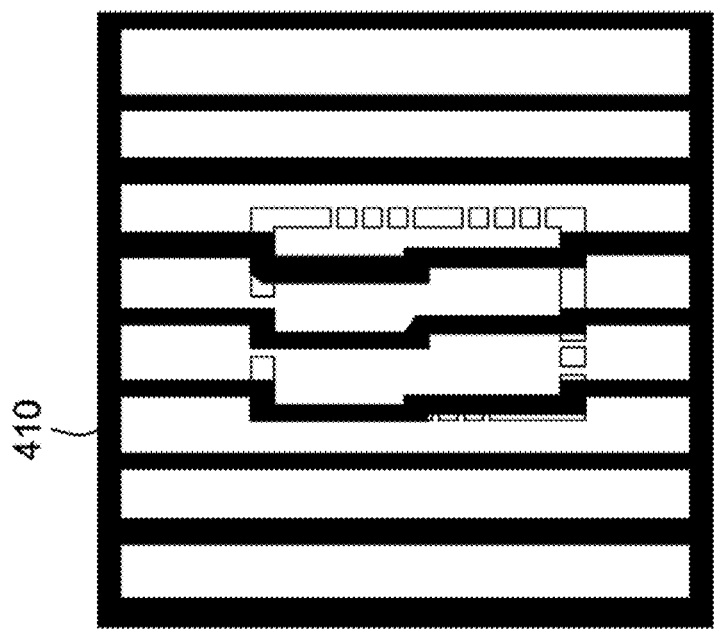
FIG. 4A illustrates a first interferogram generated from a first-order wave and a second-order wave, according to some implementations of the present disclosure.

Step 303 of the method 300 includes generating first image data reproducible as a first phase image of the sample based at least in part on the first interferogram. For example, the first image data can be generated or obtained using any of the cameras described herein (e.g., the camera 140 of the system 100 or the camera 240 of the system 200). Referring to FIG. 4B, an exemplary first phase image 420 for the sample is illustrated. The first phase image 420 is generated based at least in part on the first interferogram 410 (FIG. 4A). As shown, the first phase image 420 includes a first location A of the sample and a second location. B of the sample. The first phase image 420 can be referred to as a "cold image."

Step 303 can include a series of sub-steps to generate the first phase image 420 from the first interferogram 410. Sub-step one includes performing a Fourier transform on the raw interferogram to generate a Fourier-transformed image. Optional sub-step two includes filtering the Fourier-transformed image with a high-pass filter to suppress low spatial frequency noise. The Fourier-transformed image includes zero-order and two first-order (+/−1) components. Sub-step three includes shifting one of the first-order components to the location of the zero-order component. Sub-step four includes applying a low-pass filter to the shifted Fourier-transformed image to keep only the first-order component selected. Sub-step five includes applying an inverse Fourier transform to the rest of the low-pass filtering, resulting in a two-dimensional image having complex values. Sub-step six includes mathematically extracting phase and/or angle values from the two-dimensional image of complex values to obtain the phase image. Optional sub-step seven includes using a phase unwrap function to unwrap the phase image from sub-step six to obtain a more accurate phase image. Optional sub-step seven can be, useful, for example, if the extracted phase values will be folded when exceeding $2\pi$.

Step 304 of the method 300 includes directing a first plurality of infrared (IR) laser bursts onto the sample to heat at least a portion of the sample. The plurality of IR laser bursts includes at least one IR laser burst. Each of the first plurality of IR laser bursts has a first predetermined wavelength that is, for example, between about 4000 $cm^{-1}$ and about 400 $cm^{-1}$, between about 2700 $cm^{-1}$ and about 3300 $cm^{-1}$, between about 800 $cm^{-1}$ and about 1800 $cm^{-1}$, etc. For example, referring to FIG. 2, the IR pump laser 220, the chopper 222, the shutter 224, the fourth mirror 250D, the fifth mirror 250E, the fifth lens 252E, and the sixth mirror 250F cooperatively direct laser bursts 218 onto the sample S to cause heating.

The IR bursts cause a temperature increase in the sample, which in turn changes refractive index of the sample and the optical path length via the thereto-optic effect. The optical phase shift φ of the sample can be expressed using Equation (1) below, where n is the refractive index of the sample and l is the thickness of the sample:

$$\phi = \frac{2\pi}{\lambda}(n-1)l \qquad \text{Equation 1}$$

IR pulses with frequency ω, energy E, and illumination area A at the sample rate are absorbed the sample according to the vibrational absorption coefficient μ(ω) of the sample, causing a local temperature increase ΔT. Assuming a single pulse absorption via a steady-state adiabatic process, and following the first-order Taylor expansion of the Lambert-Beer law, the change in temperature can be expressed according to Equation (2) below:

$$\Delta T = \frac{Q}{C_p m} = \frac{(1-e^{-\mu(\omega)l})}{C_p \rho A l} \approx \frac{\mu(\omega)E}{C_p \rho A} \qquad \text{Equation 2}$$

In Equation 2, Q is the amount of heat, m is the mass, $C_p$ is the specific heat, ρ is the mass density, and E is the mid-IR pulse energy. The local temperature increase results in a change in the refractive index, as expressed by Equation 3, and a change in thickness, as expressed by Equation 4:

$$\Delta n = \frac{dn}{dT}\Delta T = \alpha \Delta T \qquad \text{Equation 3}$$

$$\Delta l = \frac{1}{l}\frac{dl}{dT}l\Delta T = \beta l \Delta T \qquad \text{Equation 4}$$

In equations 3 and 4, α is the thermo-optic coefficient and β is the linear thermal expansion coefficient. The measured change in phase shift Δφ can be obtained by finding the difference between the hot and cold frames for small Δn and Δl, as expressed by Equation 5 below:

$$\Delta l = \phi_{hot} - \phi_{cold} = \frac{2\pi}{\lambda}[(n+\Delta n)(l+\Delta l) - nl] = \frac{2\pi}{\lambda}(\Delta n l + n \Delta l) \qquad \text{Equation 5}$$

Substituting Equations 2-4 into Equation 5 results in Equation 6:

$$\Delta \phi(\omega) = \gamma l \frac{E}{A\lambda}\mu(\omega) \qquad \text{Equation 6}$$

$$\gamma = \frac{2\pi(\alpha + n\beta)}{C_p \rho}$$

In Equation 6, γl is the physical property of the sample, $\frac{E}{A\lambda}$ is me pump pulse property, and μ(ω) is the IR spectroscopic absorption.

Step 305 of the method 300 is similar to step 301 and includes directing, a second set of probe laser pulses through the sample subsequent to the first plurality of IR laser bursts (step 304). Each of the second set of laser pulses is directed through the sample at a predetermined time delay relative to the first plurality of IR bursts (step 304) to record the transient phase shift caused by the absorption of the IR bursts by the sample. The predetermined time delay can be, for example, between about 5 μs and about 100 μs, between about 0 μs and about 1,000 μs, etc.

Figure 6:
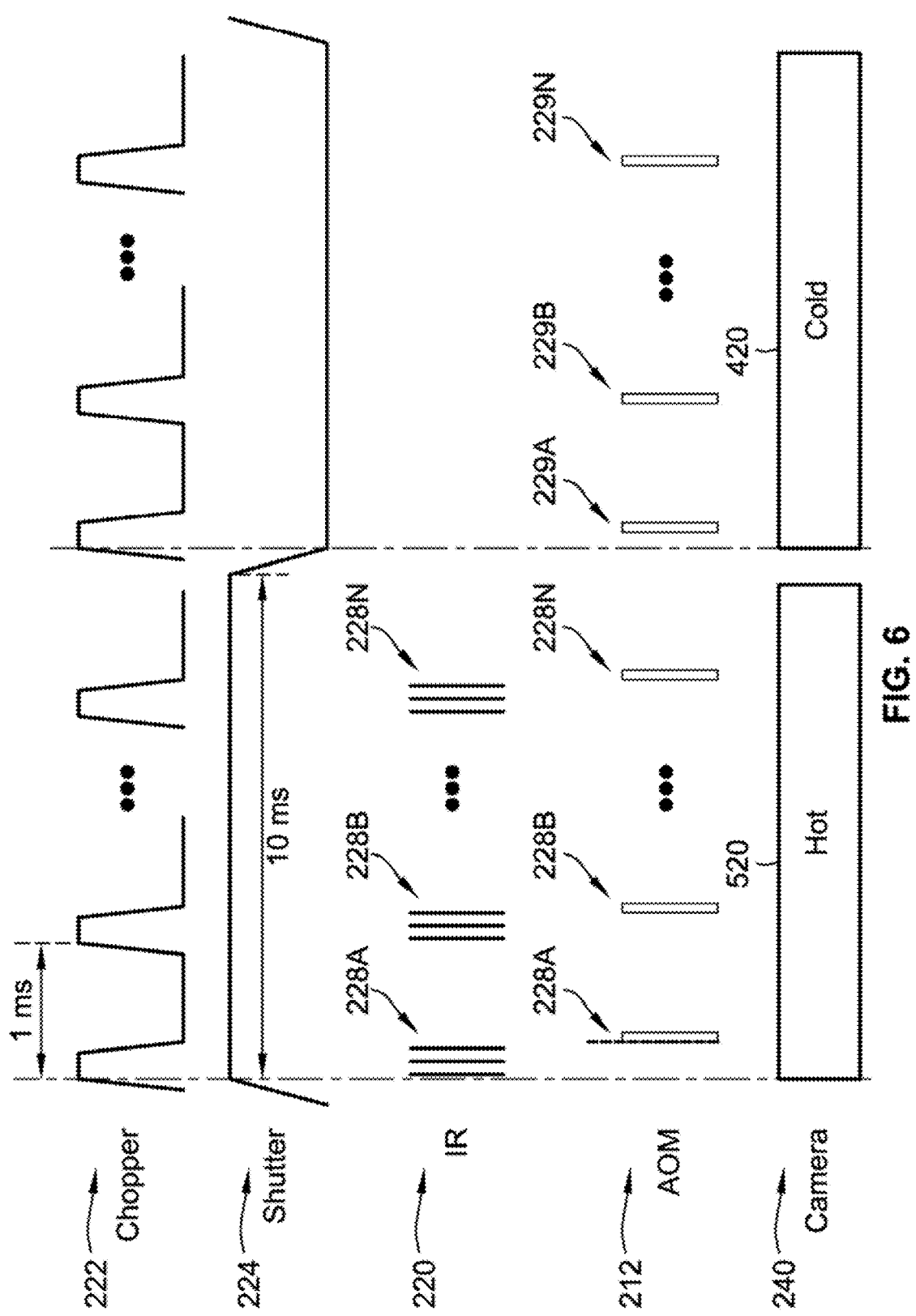
FIG. 6 illustrates a schematic timing diagram for a camera, an acousto-optical modulator, an infrared laser, a shutter, and a chopper, according to some implementations of the present disclosure.

For example, referring to FIG. 6, an exemplary schematic timing diagram for implementing steps 301-305 using the system 200 (FIG. 2) is illustrated. As shown, the IR pump laser 220, the chopper 222, and shutter 224 generate IR laser bursts 228A 228N (each including three IR laser pulses in this example). More specifically, the shutter 224 opens for a predetermined duration (e.g., about 10 ms) and the chopper 222 modulates the IR laser (e.g., such that there is a 1 ms interval between each of the IR bursts 228A-288N. The AOM 212 generates probe laser pulses 228A-228N such that they reach the sample at a predetermined time delay $t_d$ relative to a corresponding one of the IR bursts 228A-288N.

The timing illustrated in FIG. 6 can be achieved using a plurality of triggering signals. As described herein, the IR pump laser 220 (FIG. 2) can have a frequency is that is about 150 kHz. This 150 kHz signal can be used as a master clock for a pulse generator that is the same as, or similar to, the pulse generator 166 of the system 100 (FIG. 1) described herein. In turn, the pulse generator generates (i) a first triggering signal (e.g., 1 kHz) for the chopper 222, a control system of the system 200 that is the same as, or similar to the control system 160 of the system 100 (e.g., a DAQ card), and the AOM 214 for the predetermined time delay, (ii) a second triggering signal (e.g., 50 Hz) for the shutter 224, and (iii) a third triggering signal (e.g., 100 Hz) for the camera 240.

Step 306 of the method 300 (FIG. 3) is the same as, or similar to, step 302 and includes dividing each of the second of laser probes (step 305) including a plurality of orders, including a first-order wave and a second-order wave. For example, referring to FIG. 2, the transmission grating 230 divides the probe laser pulses into the first-order wave 218A and the second order wave 218B after the probe laser pulses pass through the sample S. The first-order wave and the second order-wave are directed (e.g., through lens 252D in FIG. 2) towards the camera (e.g., camera 240 in FIG. 2) and interfere with one another at the image plane of the camera to create a second interferogram. For example, referring to FIG. 5A, an exemplary second interferogram 510 created by interference between the first-order wave and the second order-wave of the probe laser pulse(s) is illustrated.

Step 306 can also include filtering the first-order wave before the first-order wave reaches the camera. For example, referring to FIG. 2, the pinhole 232 can be used to filter the first-order wave 218A prior to reaching the camera 240.

Step 307 of the method 300 includes generating second image data reproducible as a second phase image of the sample based at least in part on the second interferogram (step 306), For example, the second image data can be generated or obtained using any of the cameras described herein (e.g., the camera 140 of the system 100 or the camera 240 of the system 200). As shown by a comparison between the first interferogram 410 (FIG. 4A) and the second interferogram 510 (FIG. 5A), the transient phase shift caused by the IR laser bursts (step 304) is reflected in the second interferogram 510 (FIG. 5A).

Figure 5B:
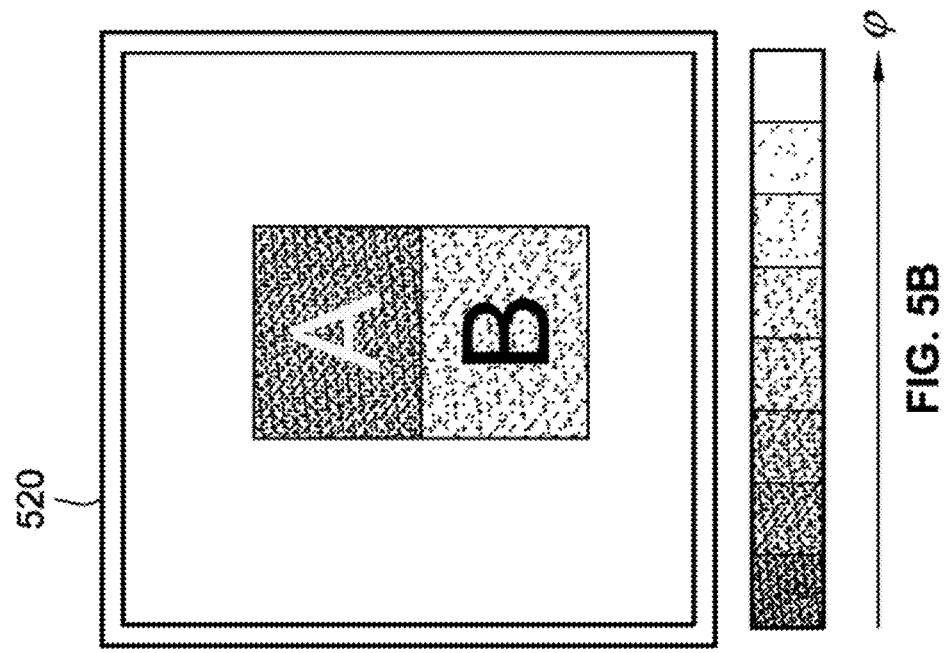
FIG. 5B illustrates a second phase image of the sample, according to some implementations of the present disclosure.
Figure 5A:
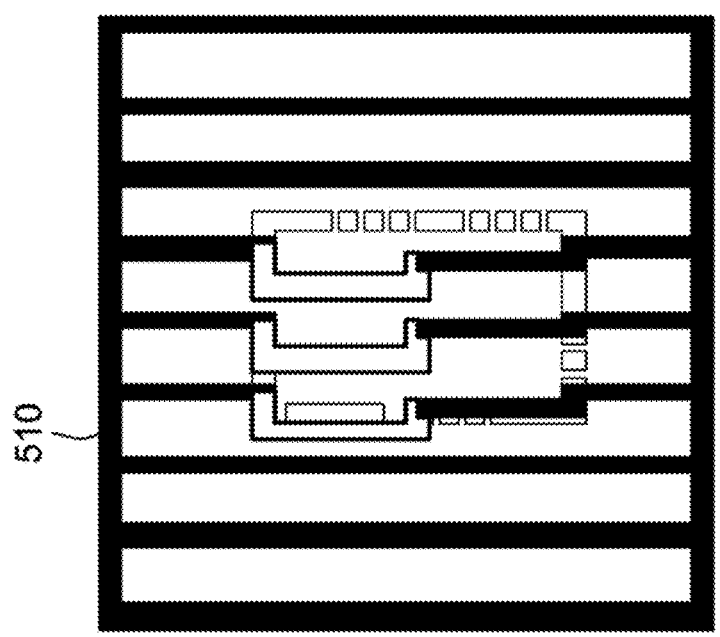
FIG. 5A illustrates a second interferogram generated from a first-order wave and a second-order wave, according to some implementations of the present disclosure.

Referring to FIG. 5B, an exemplary second phase image 520 for the sample is illustrated. The second phase image 520 is generated based at least in part on the second interferogram 510 (FIG. 5A). The transient phase shift cause by the IR laser bursts (step 304) is also reflected in a comparison between of the first location 422 and second location 424 in the first phase image 420 (FIG. 4B) and the first location A and the second location B in the second phase image 520 (FIG. 5B0. The second phase image 520 can be referred to as a "hot image."

Step 308 of the method 300 includes determining a transient phase shift at one or more locations in the sample based at least in part on the first phase image (step 303) and the second phase image (step 307). For example, step 308 can include subtracting the second phase image 520 (FIG. 5B) from the first phase image 420 (FIG. 4B) to determine the transient phase shift.

Step 309 of the method 300 includes generating a bond-selective transient phase (BSTP) image of the sample based at least in part on the first phase image (step 303) and the second phase image (step 307). The BSTP image provides quantitative chemical information associated with the sample, such as, for example, chemical composition, and thermodynamic properties. The chemical information associated with the sample can include a map indicative of a distribution of chemical bonds having absorption properties in the mid-Infrared excitation range. For example, a lipid map can be obtained with a mid-Infrared excitation of about 2850 $cm^{-1}$ and a protein map can be Obtained with an excitation at about 1650 $cm^{-1}$.

In some implementations, the method 300 includes repeating steps 301-308 one or more times prior to step 309. In such implementations, steps 301-308 can be repeated one or more times for the first wavelength of the IR bursts (step 304). For example, referring to FIG. 4B, FIG. 5B, and FIG. 6 the first phase image 420 (FIG. 4B) and the second phase image 520 (FIG. 5B) constitute a pair of hot-cold images. Steps 301-308 can be repeated to generate a plurality of pairs of hot-cold images for the first wavelength (e.g., 2 pairs, 5 pairs, 10 pairs, 20 pairs, 50 pairs, etc.). Each of these pairs of hot-cold images for a single wavelength can be averaged together when generating the BSTP image of the sample.

Steps 301-308 can also be repeated one or more times with a differing wavelength of the IR bursts (step 304) during each iteration. In such implementations, steps 301-308 can be repeated to scan between a predetermined range of wavelengths (e.g., between about 4000 $cm^{-1}$ and about 400 $cm^{-1}$, between about 2700 $cm^{-1}$ and about 3300 $cm^{-1}$ between about 800 $cm^{-1}$ and about 1800 $cm^{-1}$, etc.). Preferably, the predetermined range of wavelengths is between about 4000 $cm^{-1}$ and about 400 $cm^{-1}$.

Figure 7:
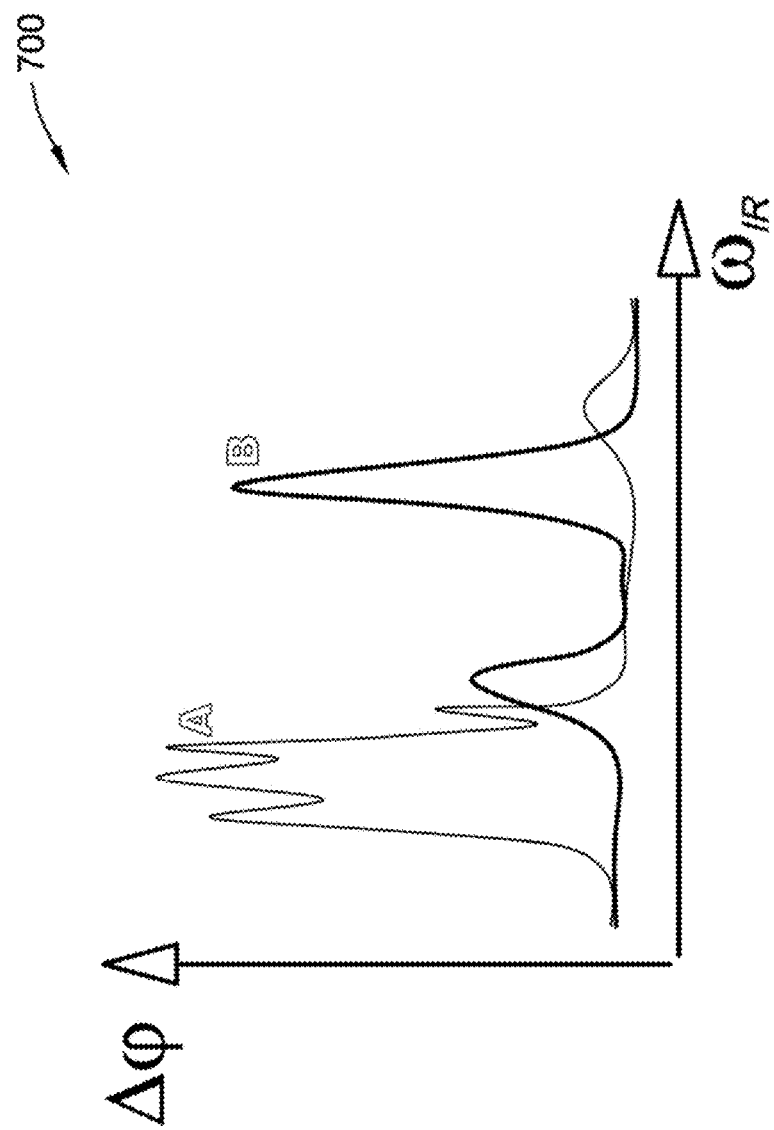
FIG. 7 illustrates transient phase shift plotted versus infrared frequency, according to some implementations of the present disclosure.

Referring to FIG. 7, a plot 700 illustrates the transient phase shift versus the wavelength of the IR laser bursts for location A and location B (FIGS. 4B and 5B) on the sample S. As shown, location A has an absorption peak 701 caused by vibrational absorption the IR bursts at a first wavelength. Similarly, location B has an absorption peak 702 caused by vibrational absorption of the IR bursts at a second wavelength. In this manner, the spectroscopy at each pixel in the BSTP images of the sample S can be determined.

In such implementations of the method 300 where steps 301-308 are repeated one or more times prior to step 309, step 309 can include averaging each pair of phase images from each iteration of steps 301-308.

The systems and methods described herein provide many advantages and improvements relative to prior IR imaging systems. For example, these systems and methods provide the nanosecond-scale temporal resolution. This is desirable for molecular phase imaging of living samples (e.g., living cells) in aqueous environments because water dissipates heat faster than many other media, such as oil. The theoretical maximum imaging speed of the systems and methods described heroin is only limited by the thermal relaxation time, which is typically a few tens of microseconds (e.g., if the decay is 6.9 µs, this is equivalent to about 70,000 frames per second). As another example, the systems and methods described herein are able to prove subtle phase changes induced by IR absorption.

Characterization of the BSTP Imaging Signal with a Thin Oil Film

Referring generally to FIGS. 8A-8F, a thin oil film was imaged using the systems and methods described herein. In this example, the IR laser bursts (e.g., that are the same as, or similar to the IR bursts 228 of FIG. 2) were tuned to 2950 $cm^{-1}$ and the probe width was set to 900 ns. For each IR laser burst, 6 IR pulses passed through the chopper within the 1 ms burst cycle with a 6.6 µs interval.

Figure 8B:
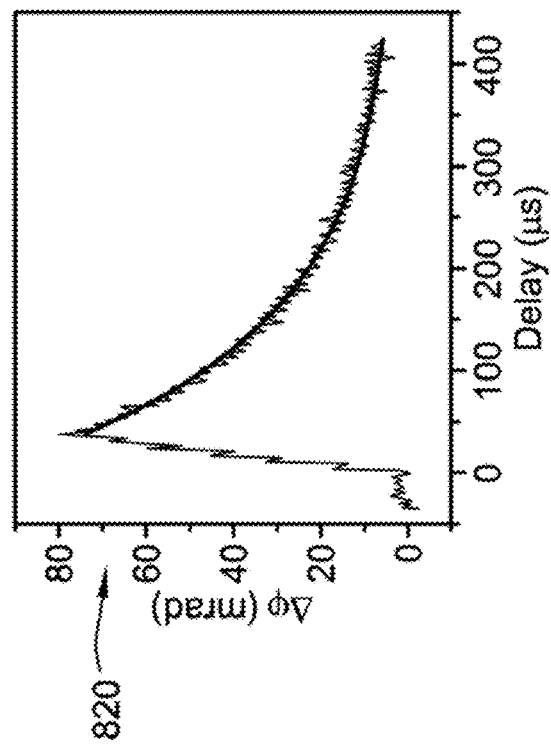
FIG. 8B illustrates an exemplary temporal profile of a BTSP signal, according to some implementations of the present disclosure.
Figure 8A:
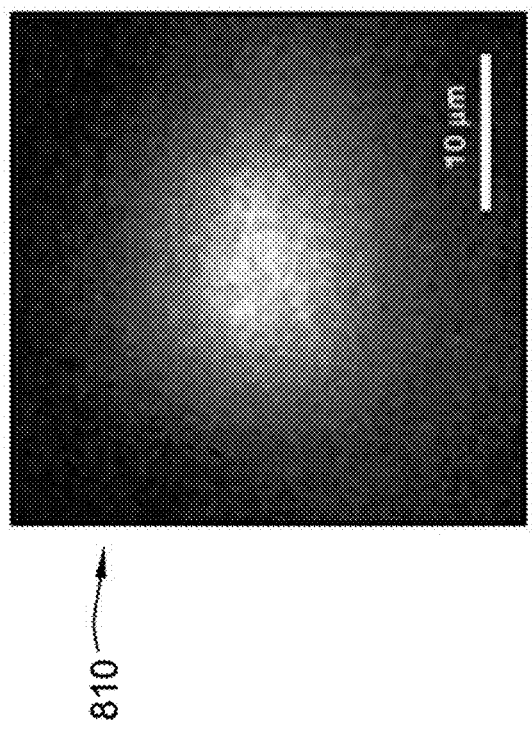
FIG. 8A illustrates an exemplary bond-selective transient phase (BTSP) image for an oil film sample, according to some implementations of the present disclosure.

Referring to FIG. 8A, an exemplary BTSP image 800 of an oil film sample is illustrated. Referring to FIG. 8B, a first plot 810 indicative of a temporal profile of the BTSP signal for the BTSP image 810 of FIG. 8A is illustrated. The temporal profile illustrates the change in phase shift versus the predetermined time delay described herein. As shown, the transient phase shift Δϕ (mrad) is plotted against the predetermined time delay (µs) described herein (e.g., in connection with step 305 of the method 300).

Figure 8C:
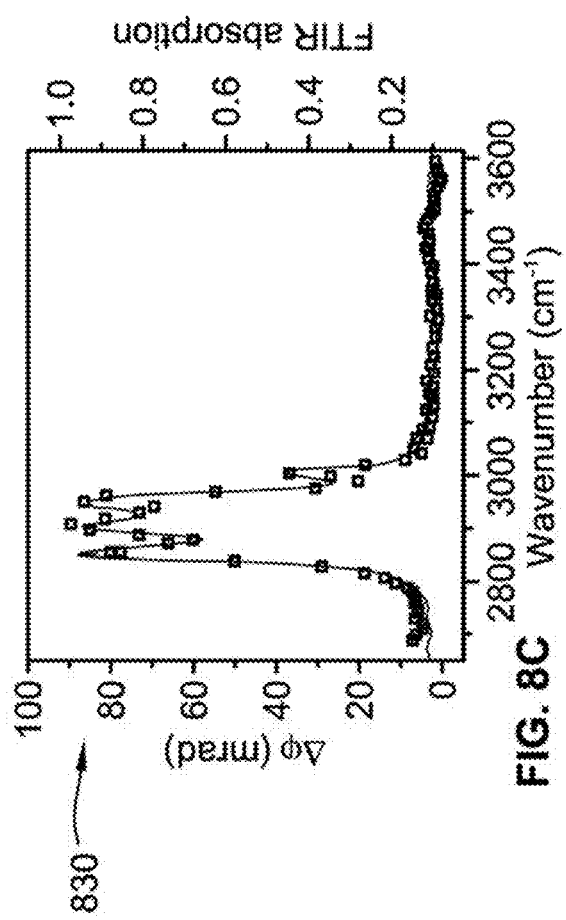
FIG. 8C illustrates an exemplary spectral field of the BSTP signal (FIG. 8B) plotted against standard Fourier transform infrared (FTIR) spectroscopy, according to some implementations of the present disclosure.

Referring to FIG. 8C, a second plot 820 indicative of a spectral fidelity of the BSTP signal (FIG. 88) (squares) compared to standard Fourier transform IR (FTIR) spectroscopy is illustrated. More specifically, the second plot 820 verifies that the measured change in phase shift Δϕ (mrad) is proportional to the absorption coefficient µ(ω). By fitting the 2910 $cm^{-1}$ peak, a full-width-at-half m maximum of 8.9 $cm^{-1}$ was obtained, which is consistent with the spectral width of 6-9 $cm^{-1}$ for the IR laser. Thus, the second plot 820 demonstrates that the BSTP imaging systems and methods described herein are capable of generating high-fidelity spectroscopic images.

Referring to FIG. 8D, a third plot 830 indicative of pump power dependence is illustrated (e.g., for the IR pump laser 220 described herein). As shown, phase change (mrad) is plotted against pump pulse energy (µJ). The third plot 830 illustrates that the BSTP signal is proportional to the pump power, which in turns demonstrates linear absorption by the sample. Referring to FIG. 8E, a fourth plot 840 indicative of probe power e.g., from the probe laser 210 described herein) dependence is illustrated. As shown, phase change (mrad) is plotted against photos per pixel. Unlike the third plot 830 (FIG. 8D), the fourth plot 840 illustrates that the BSTP signal is independent of the probe power.

Referring to FIG. 8F, a fifth plot 850 indicative of a signal-to-noise ratio (SNR) of the BSTP signal with different probe power (squares) and the fitted curve (line) is illustrated. As shown, image (SNR) is plotted against photons per pixel. While the probe power is independent of the BTSP signal (FIG. 8D), the fifth plot 850 illustrates that higher probe power increases the SNR by reducing the noise level in the phase image. The relation between SNR and the number of photons N can be expressed as SNR α $N^{0.39}$. Preferably, for the shot-noise-limited signal, the power term would be 0.5 according to the Poisson distribution. The SNR can be further improved by capturing more photons using stronger probe pulses and a faster camera.

The resulting temperature increase in the oil film caused by the IR laser bursts is estimated to be approximately 1.5 K. Assuming no heat dissipation, the change in temperature can be expressed using the following equation, where Q is the absorbed IR energy, ρ is the oil density, A is the area of illumination, d is the sample thickness, $C_p$ is the specific heat, in is the mass of oil:

$$\Delta T = \frac{Q}{mC_p} = \frac{Q}{\rho A d C_p}$$

In this example, the total IR transmission of the system was measured to be 17% after a clean-up filter, an uncoated $CaF_2$ beam sampler, and 12 gold surfaces. Thus, for a 0.67 μJ pulse out of the laser, about 0.11 μJ reaches the sample. The IR spot size is about 110 μm, calculated from the 4 mm beam diameter and 100 mm focusing lens (effective focal length 105 at 3,300 nm) Thus, the laser energy density is 11.3 $J/m^2$. The absorption coefficient of oil at 2950 $cm^{-1}$ is estimated to be 3,000/cm, thus, 90% of the IR energy went into the oil at 3.3 μm. Using 880 $kg/m^3$ for ρ and 2,300 J/KgK for $C_p$, the change in temperature is 1.5 K.

BSTP Imaging of Polyurethane Beads

Referring generally to FIGS. 9A-9E, an exemplary application of the systems and methods described herein to polyurethane (PU) beads to demonstrate chemical selectivity is illustrated. The bead sample are U7-D50 beads manufactured by HOS-Technik GmbH of Austria with a size distribution of 50% particles at 7 μm. A thin film of PU beams on a thin sapphire coverslip having a 127 μm thickness was prepared using the drop-casting method. Another small droplet of DMSO solution was added. The PU heads in the DMSO solution were sandwiched by a second thin sapphire coverslip having a 254 μm thickness.

Figure 9A:
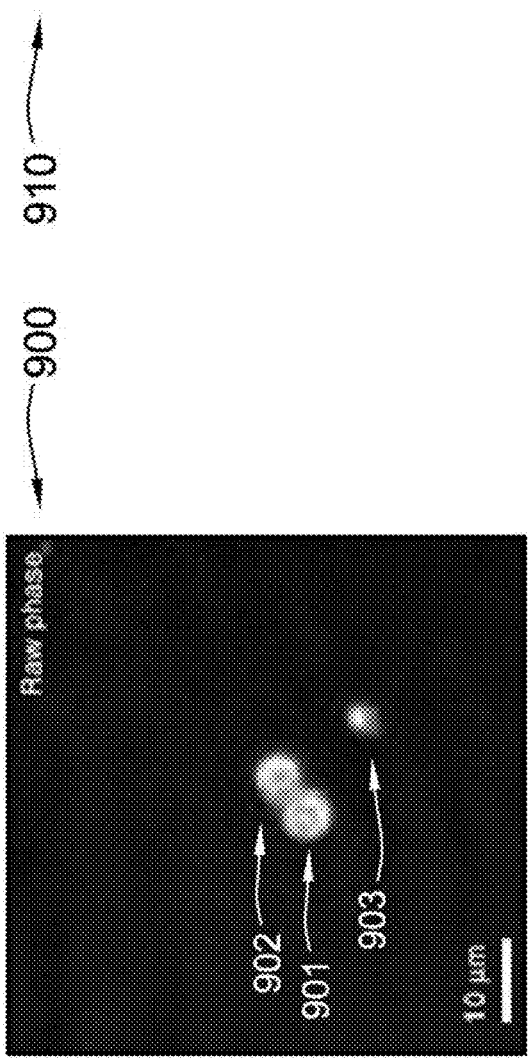
FIG. 9A illustrates an exemplary raw phase image of polyurethane (PU) beads, according to some implementations of the present disclosure.
Figure 9B:
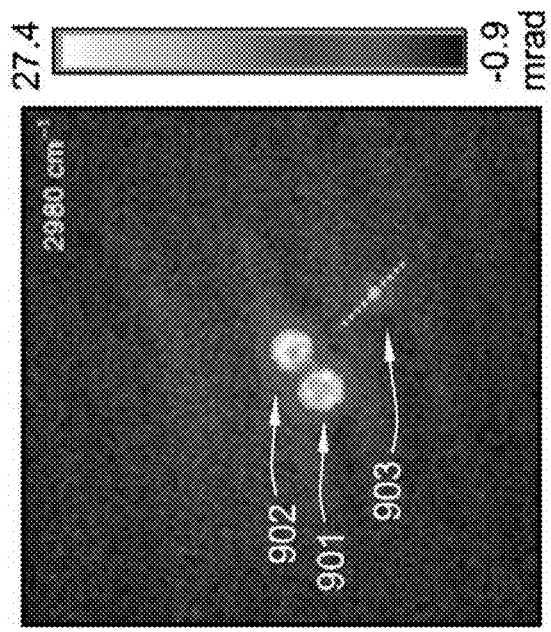
FIG. 9B illustrates a first exemplary BSTP image of the PU beads at a first wavelength, according to some implementations of the present disclosure.
Figure 9C:
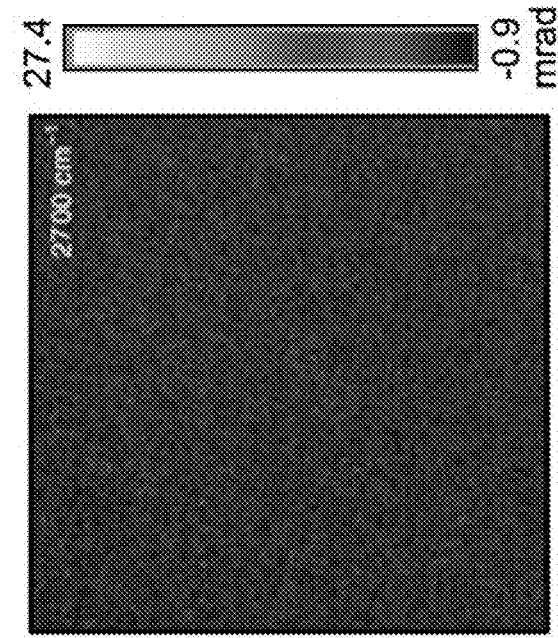
FIG. 9C illustrates a second exemplary BSTP image of the PU beads at a second wavelength, according to some implementations of the present disclosure.

Referring to FIG. 9A, an exemplary raw phase image 900 of beads 901-903 is illustrated. Referring to FIG. 9B, a first BSTP image 910 of the beads 910-903 is illustrated where the IR laser bursts were tuned to an absorption peak of 2980 $cm^{-1}$. Referring to FIG. 9C, a second BSTP image 920 of the beads 901-903 is illustrated where the IR laser bursts were tuned to an off resonance frequency of 2700 $cm^{-1}$. As shown by a comparison between FIG. 9B and FIG. 9C, the first BSTP image 910 (FIG. 9B) has better contrast than the second BSTP image 920 (FIG. 9C).

To generate the BSTP images 910 and 920, the chopper (e.g., chopper 222) was actuated to allow only one FR pulse to pass in each chopper cycle of 1 ms. The probe pulse width was 1.5 μs, the predetermined time delay of the probe pulse with respect to the peak of the IR pulse was set to 0, and the camera (e.g., camera 240) was running at a speed of 100 Hz (100 frames per second). Au average of 30 pairs of cold-hot phase images was used to obtain the final BSTP images, providing a finalized imaging speed of 1.67 Hz (1.67 images per second).

Figure 9D:
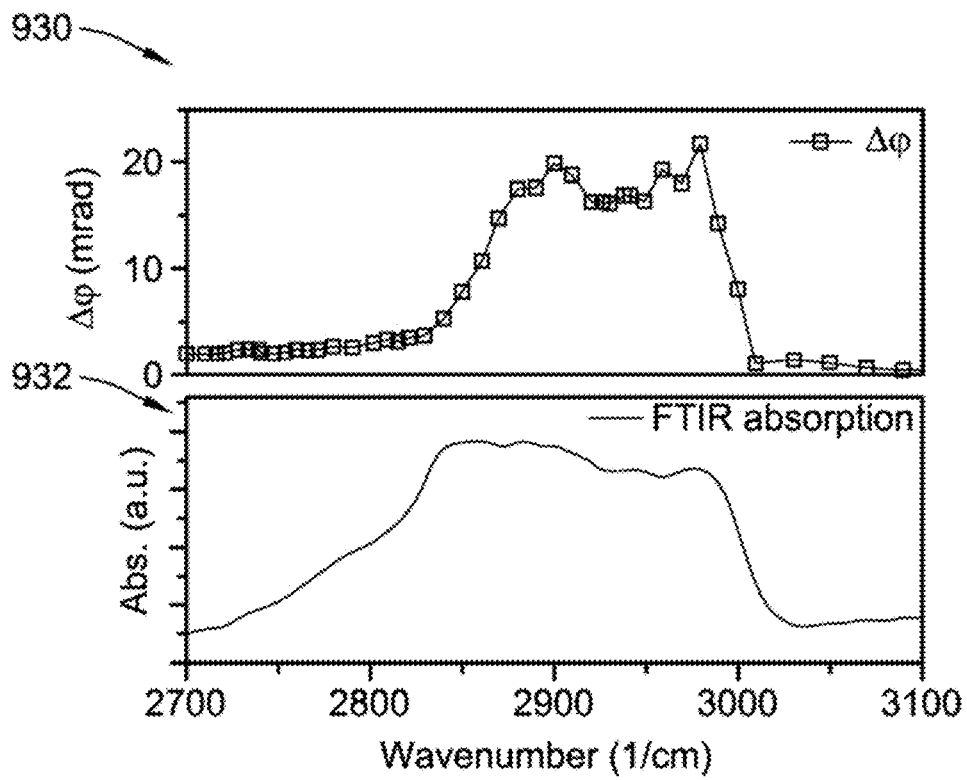
FIG. 9D illustrates a first plot indicative of the phase-based IR spectrum of the PU beads and a second plot indicative of the FTIR absorption profile of the PU beads, according to some implementations of the present disclosure.

Referring to FIG. 9D, a first plot 930 indicative the phase-based IR spectrum of the sample (beads 901-903) and a second plot 932 indicative of the FTIR absorption profile of the sample are illustrated. As shown by the second plot 932, the FTIR microscope had difficulty acquiring spectra from single beads due to the IR diffraction limit. By contrast, and as evidenced by the first plot 930, BTSP imaging provides a baseline-free spectrum because the signal only arises from the actual IR absorption and as a result, small characteristic peaks at 2900 $cm^{-1}$ and 2980 $cm^{-1}$ were observed that were not obvious in the FTIR measurements (plot 932).

Figure 9E:
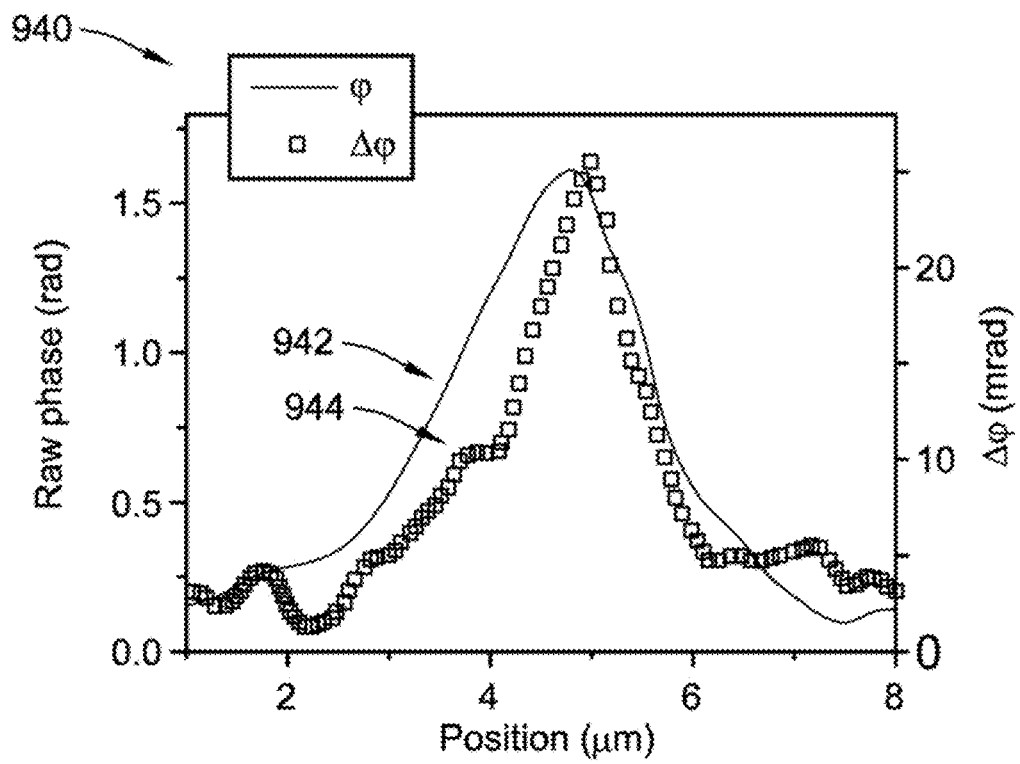
FIG. 9E illustrates a plot comparing a line profile of the BU beads from the raw phase image (FIG. 9A) and a line profile BU beads from the BSTP images (FIGS. 9B and 9C), according to some implementations of the present disclosure.

Referring to FIG. 9E, a fourth plot 940 compares a line profile 942 of the bead from the raw phase image (FIG. 9A) and a line profile 944 of the BSTP images (FIGS. 9B-9C), illustrating consistency.

BSTP Imaging of Living 3T3 Cells

Figure 10A:
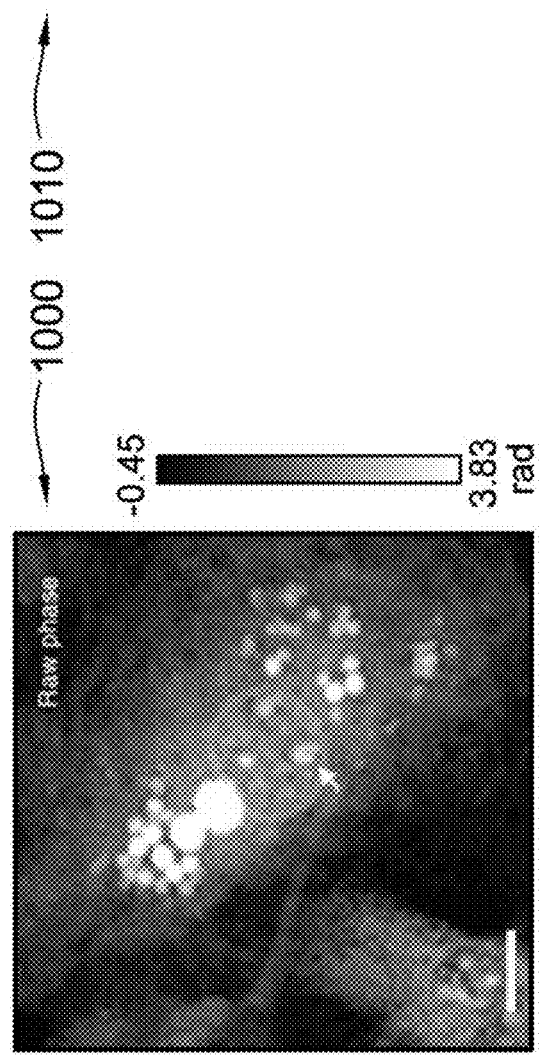
FIG. 10A illustrates an exemplary raw phase image of living 3T3 cells, according to some implementations of the present disclosure.

Referring generally to FIGS. 10A-10F, the BTSP systems and methods described herein can be used in life science applications, such as, for example imaging living 3T3 cells in an aqueous environment. Referring to FIG. 10A, a raw phase image 1000 of 3T3 cells is illustrated.

Figure 10B:
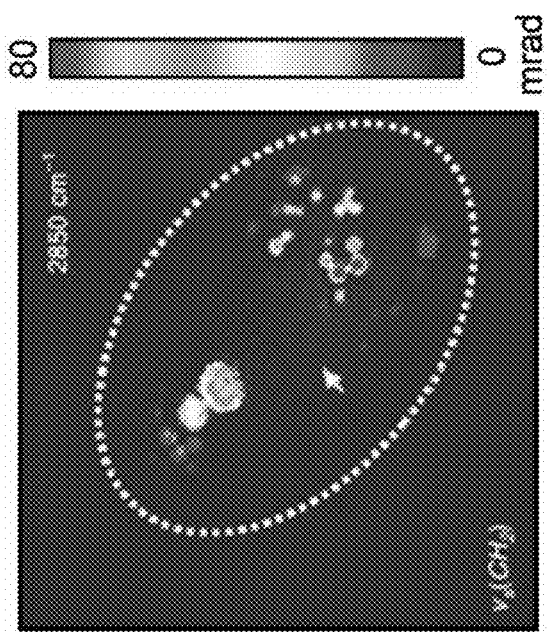
FIG. 10B illustrates a first exemplary BSTP image of the 3T3 cells at a first wavelength, according to some implementations of the present disclosure.

Referring to FIG. 10B, a first BSTP image 1010 of the 3T3 cells is illustrated. In the first BSTP image 1010, the wavelength of the IR bursts was tuned to 2850 $cm^{-1}$ for $CH_2$ symmetric stretching.

Figure 10C:
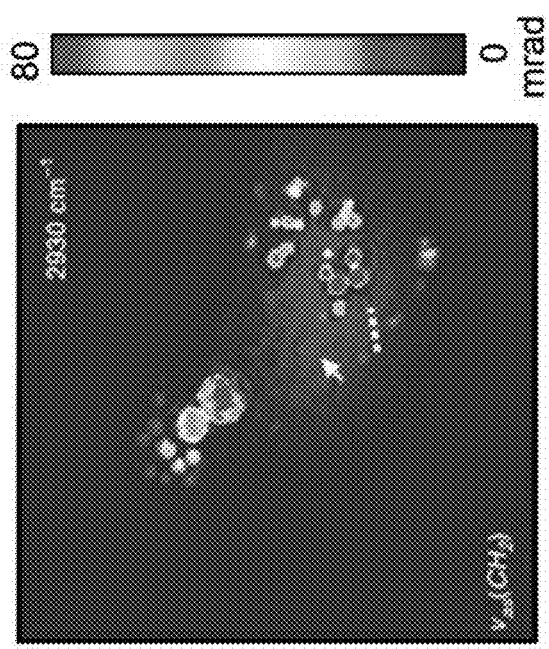
FIG. 10C illustrates a second exemplary BSTP image of the 3T3 cells at a second wavelength, according, to some implementations of the present disclosure.

Referring to FIG. 10C, a second BSTP image 1020 of the 3T3 cells is illustrated. In the second BSTP image 1020, the wavelength of the IR bursts was tuned to 2930 $cm^{-1}$ for $CH_2$ asymmetric stretching.

Referring to FIG. 10D, a third BSTP image 1030 of the 3T3 cells is illustrated. In the third BSTP image 1030, the wavelength of the IR bursts was tuned to 2950 $cm^{-1}$ for $CH_3$ stretching. Strong lipid drop signals are present in the third BSTP image 1030, along with the nucleolus contributed by the CH groups in nucleic acids.

Referring to FIG. 10E, a fourth BSTP image 1040 of the 3T3 cells is illustrated. In the fourth BSTP image 1040, the wavelength of the IR bursts was tuned to 2700 $cm^{-1}$ for off-resonance. As shown in FIG. 10E, there is no observable contrast in the fourth BSTP image 1040 for off-resonance.

Referring to FIG. 10F, plot 1050 illustrates an BSTP intensity profile 1052 of a small feature and a Gaussian fitting result 1054.

In the example of FIGS. 10B-10E, the maximum laser energy density was 11 $J/m^2$, which is lower than 100 $J/m^2$ permitted for cornea exposure according to ANSI standards. As described above, the 3T3 cells where in an aqueous environment. BSTP imaging mitigates the effects of water in two ways. First, for the phase measurement, the IR photons only need to reach the molecules inside a sample. Even at 1% IR power, absorbing molecules would generate a detectable phase shill in the visible probe beam. Thus, the penetration depth can be over 150 μm at 2700 $cm^{-1}$, for example. Second, water has a high heat capacity, low dn/dT, and a low thermal expansion coefficient, resulting in a smaller temperature increase and phase shift. As a result, water generally generates a phase shift Δϕ value that is 25-80 times smaller than the phase shift Δϕ generated by lipids.

Figure 12A:
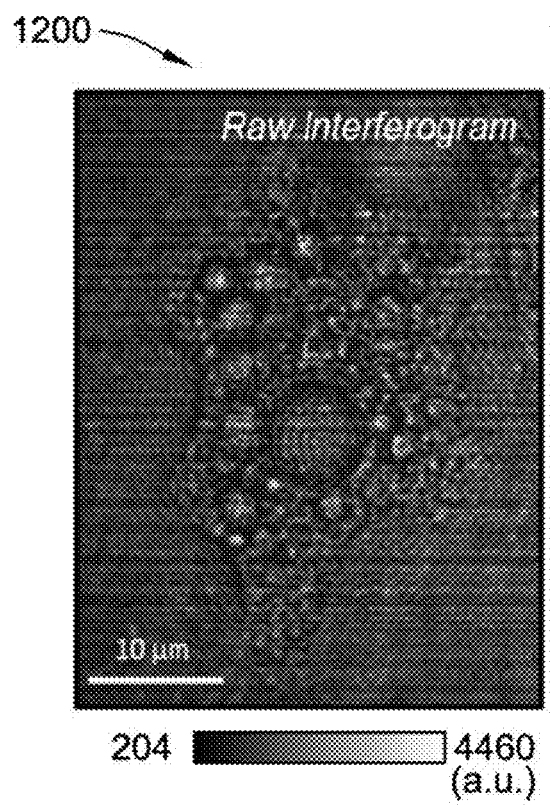
FIG. 12A illustrates an exemplary raw interferogram of live 3T3 cells, according to some implementations of the present disclosure.
Figure 12B:
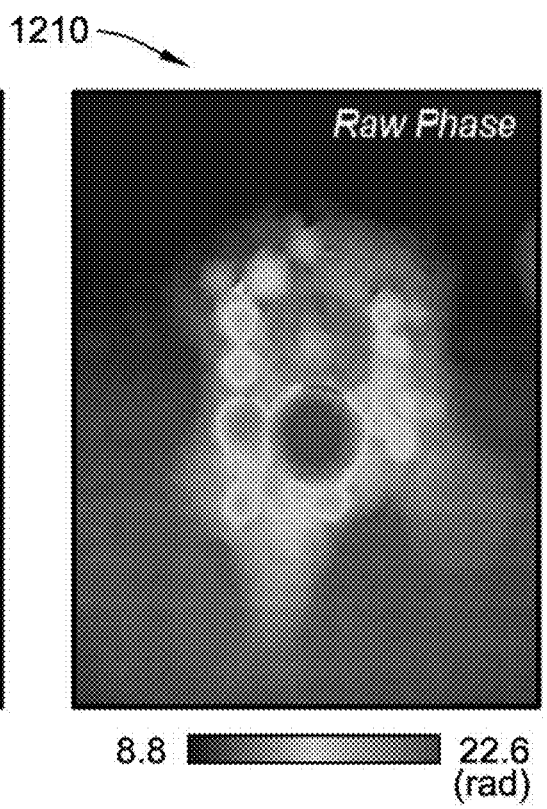
FIG. 12B illustrates an exemplary first BSTP image of the live 3T3 cells at a first wavelength, according to some implementations of the present disclosure.
Figure 12C:
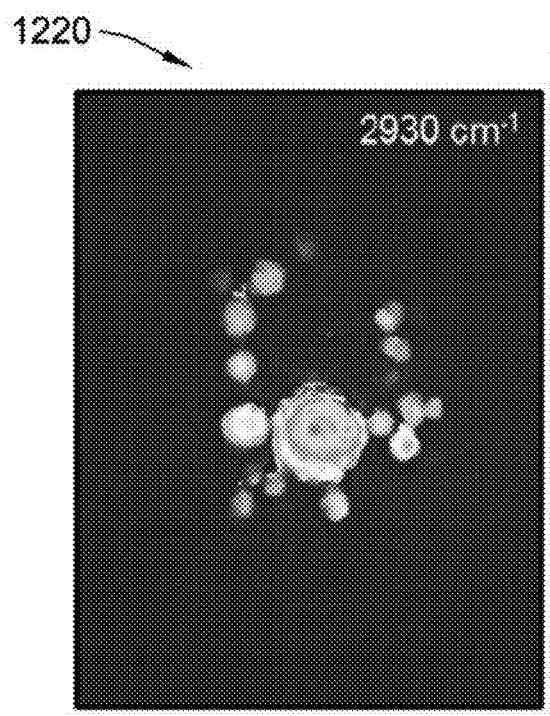
FIG. 12C illustrates an exemplary second BSTP image of the live 3T3 cells at a second wavelength, according to some implementations of the present disclosure.
Figure 12D:
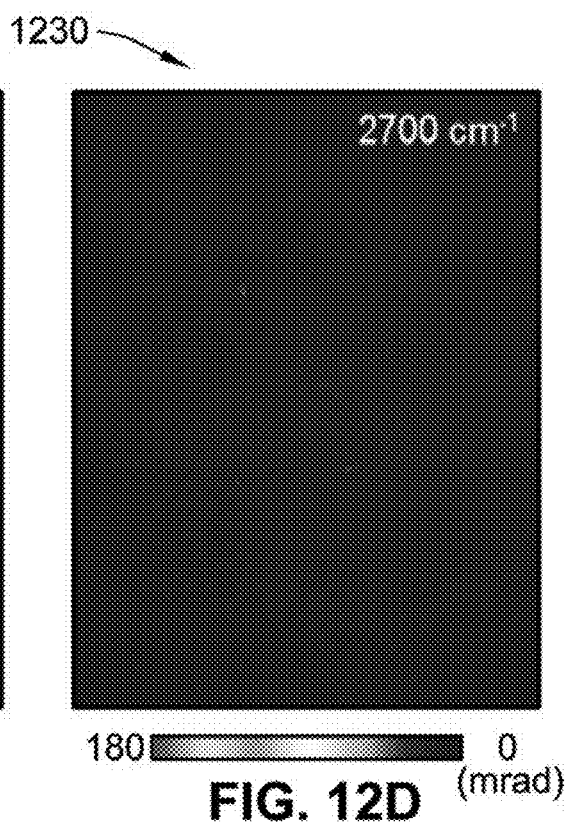
FIG. 12D illustrates an exemplary third BSTP image of the live 3T3 cells at a third wavelength, according to some implementations of the present disclosure.

Referring generally to FIGS. 12A-12D, additional BSTP images of the same or similar living 3T3 cells with 2930 $cm^{-1}$ and 2700 $cm^{-1}$ off-resonance mid-IR excitations are illustrated. FIG. 12A illustrates a raw interferogram 1200 of the 3T3 cells. FIG. 12B illustrates a raw phase image 1210 of the 3T3 cells. FIG. 12C illustrates a first BSTP image 1220 of the 3T3 cells at a peak of 2930 $cm^{-1}$. FIG. 12D illustrates a second BSTP image 1230 of the 3T3 cells at off-resonance of 2930 $cm^{-1}$. These BSTP images were taken with a single IR pulse at 100 frames per second, i.e., 50 pairs of hot and cold frames, with a 50-frame average for a high SNR, which leads to an imaging speed of 1 Hz.

BSTP Imaging of an Interface Between DMSO and Oil

Referring generally to FIGS. 11A-11F, to further demonstrate chemical selectivity, the systems and methods described herein were used to perform BSTP imaging at an interface between dimethyl sulfoxide (DMSO) and olive oil. Two small droplets of oil and DMSO were sequentially dropped onto a thin sapphire coverslip having a 127 µm thickness to form the interface. A second sapphire coverslip sandwiched the oil and DMSO sample.

Referring to FIG. 11A, a plot 1100 indicative of a measured FTIR spectra of the DMSO and oil samples is illustrated. Referring to FIG. 11B, a raw phase image 1110 of DMSO 1112 and oil 1114 is illustrated.

Referring to FIG. 11C, a first BSTP image 1120 of DMSO 1112 and oil 1114 is illustrated. In this first BSTP image 1120, the wavelength of the IR bursts was set to 2950 cm$^{-1}$. As shown, the sample is heated by the IR bursts at area 1116. Referring to FIG. 11D, a second BSTP image 1130 of DMSO 1112 and oil 1114 is illustrated. In this second BSTP image 1130, the wavelength of the IR bursts was set to 2912 cm$^{-1}$. Referring to FIG. 11E, a third BSTP image 1140 of DMSO 1112 and oil 1114 is illustrated. In this third BSTP image 1140, the wavelength of the IR bursts was set to 3000 cm$^{-1}$. Referring to FIG. 11F, a fourth BSTP image 1150 of DMSO 1112 and oil 1114 is illustrated. In this fourth BSTP image 1150, the wavelength of the IR bursts was set to 3100 cm$^{-1}$. Wavelength is 3100 cm$^{-1}$.

To generate the BSTP images 1110-1140, the chopper (e.g., chopper 222) was actuated to allow only one IR pulse to pass in each chopper cycle of 1 ms. The probe pulse width was 1.5 µs. Ten pairs of hot and cold images for averaging were applied for imaging at 2985 cm$^{-1}$, 2912 cm$^{-1}$, and 3100 cm$^{-1}$. Because the absorption of DMSO was weak at 3000 cm$^{-1}$, averaging of 100 pairs was used.

Comparison of BSTP Imaging and Other Microscope Modalities

Table 1 includes various characteristics of the BSTP imaging systems and methods described herein, FTIR microscope techniques, fluorescence microscope techniques, pump-probe microscope techniques, and phase microscope techniques.

TABLE 1

| Modality | Chemical selectivity | Spatial resolution | Imaging speed | Temporal resolution |
|---|---|---|---|---|
| BSTP microscope | Fingerprint | Sub-micron | 50 fps | Nanosecond level |
| FTIR microscope | Fingerprint | ~10 µm | <0.1 fps | Minute level |
| Fluorescence microscope | Depending on labeling | ~0.3 µm-50 nm | Up to 1000's fps | Nanosecond level |
| Pump-probe microscope | Only for electronic absorption | Up to ~0.3 µm | Video rate | Femto-to picosecond |
| Phase microscope | No | Up to ~0.3 µm | Video rate | Microsecond level |

While the present disclosure has been described with reference to one or more particular embodiments or implementations, those skilled in the art will recognize that many changes may be made thereto without departing from the spirit and scope of the present disclosure. Each of these implementations and obvious variations thereof is contemplated as falling within the spirit and scope of the present disclosure. It is also contemplated that additional implementations according to aspects of the present disclosure may combine any number of features from any of the implementations described herein.

What is claimed is:

1. A method comprising:
generating first image data reproducible as a first phase image of a sample by directing a first plurality of probe laser pulses through the sample;
causing at least a portion of the sample to be heated by causing a plurality of pump laser bursts to be directed towards the sample;
generating second image data reproducible as a second phase image of the sample by directing a second plurality of probe laser pulses through the sample, each of the second plurality of probe laser pulses passing through the sample at a predetermined time delay subsequent to a corresponding one of the plurality of pump laser bursts;
determining a first transient phase shift based at least in part on a comparison between the first phase image and the second phase image; and
determining a vibrational spectroscopy property of the sample based at least in part on the determined first transient phase shift.

2. The method of claim 1, wherein the determining the vibrational spectroscopy property allows for an identification of chemical bond information within the sample.

3. The method of claim 1, wherein the sample includes in-vivo cells.

4. The method of claim 1, wherein predetermined time delay is between about 5 µs and about 100 µs.

5. The method of claim 1, wherein the directing the first plurality of probe laser pulses through the sample includes dividing the first plurality of probe laser pulses into a first plurality of waves.

6. The method of claim 5, wherein the first plurality of waves includes a first-order wave and a second-order wave.

7. The method of claim 6, wherein the dividing the first plurality of probe laser pulses includes filtering the first-order wave.

8. The method of claim 1, wherein a wavelength of the plurality of pump laser bursts is between about 400 cm$^{-1}$ and about 4000 cm$^{-1}$.

9. The method of claim 1, further comprising:
generating third image data reproducible as a third phase image of the sample by directing a third plurality of probe laser pulses through the sample;
causing at least a portion of the sample to be heated by directing a second plurality of pump laser bursts towards the sample;
generating fourth image data reproducible as a fourth phase image of the sample by directing a fourth plurality of probe laser pulses through the sample, each of the fourth plurality of probe laser pulses passing through the sample at a predetermined time delay subsequent to a corresponding one of the second plurality of pump laser bursts.

10. The method of claim 9, further comprising generating a bond-selective transient phase (BSTP) image of the sample based at least in part on the first phase image, the second phase image, the third phase image, and the fourth phase image.

11. A system for imaging a sample, the system comprising:
a memory storing machine-readable instructions; and
a control system including one or more processors, the control system configured to execute the machine-readable instructions to:
cause a first plurality of probe laser pulses to be directed through the sample;
receive first image data reproducible as a first phase image of the sample;
cause a plurality of pump laser bursts to be directed towards the sample to heat at least a portion of the sample;
cause each of a second plurality of probe laser pulses to be directed through the sample at a predetermined time delay subsequent to a corresponding one of the plurality of pump laser bursts;
receive second image data reproducible as a second phase image of the sample; and
generate a bond-selective transient phase (BSTP) image of the sample based at least in part on the first phase image and the second phase image.

12. The system of claim 11, further comprising a camera for generating the first image data and the second image data.

13. The system of claim 11, wherein the camera is a complementary metal-oxide-semiconductor (CMOS) camera having a predetermined well depth and a predetermined frame rate.

14. The system of claim 13, wherein the predetermined well depth is between about 30,000 photoelectrons and about 2,000,000 photoelectrons and the predetermined frame rate is about 100 frames per second.

15. The system of claim 11, further comprising a probe laser source and a pump laser source.

16. The system of claim 15, further comprising an objective lens positioned between the probe laser source and the sample and the pump laser source and the sample.

17. The system of claim 16, further comprising a transmission grate configured to split each of the first plurality of laser pulses and the second plurality of laser pulses into a first-order wave and a second-order wave.

18. The system of claim 17, further comprising a pinhole positioned between the transmission grating and the camera, the pinhole configured to filter the first-order wave of each of the first plurality laser pulses and each of the second plurality of laser pulses.

19. The system of claim 16, further comprising one or more mirrors, one or more lenses, or both.

20. The system of claim 16, further comprising an acousto-optical modulator (AOM) positioned between the probe laser source and the sample.

21. The system of claim 16, further comprising a shutter including an aperture.

* * * * *